(12) United States Patent
Konakawa et al.

(10) Patent No.: US 8,142,247 B2
(45) Date of Patent: Mar. 27, 2012

(54) EXHAUST DEVICE FOR OUTBOARD MOTOR ENGINE AND OUTBOARD MOTOR

(75) Inventors: Tsugunori Konakawa, Shizuoka (JP); Yusuke Takahashi, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 368 days.

(21) Appl. No.: 12/542,054

(22) Filed: Aug. 17, 2009

(65) Prior Publication Data

US 2010/0056001 A1 Mar. 4, 2010

(30) Foreign Application Priority Data

Aug. 28, 2008 (JP) .................. 2008-219373

(51) Int. Cl.
*F01N 3/10* (2006.01)
(52) U.S. Cl. .................................................. 440/89 H
(58) Field of Classification Search .................. 60/299; 440/89 R, 89 H
See application file for complete search history.

(56) References Cited

U.S. PATENT DOCUMENTS

| 5,408,829 | A | | 4/1995 | Woodward |
| 5,425,232 | A | | 6/1995 | Holtermann |
| 5,554,057 | A | * | 9/1996 | Abe et al. ............. 440/89 R |
| 6,439,938 | B1 | * | 8/2002 | Katayama ............. 440/88 R |

OTHER PUBLICATIONS

Konakawa; "Outboard Motor"; U.S. Appl. No. 12/542,059, filed Aug. 17, 2009.

* cited by examiner

*Primary Examiner* — Edwin Swinehart
(74) *Attorney, Agent, or Firm* — Keating & Bennett, LLP

(57) ABSTRACT

An exhaust device for an outboard motor engine includes an exhaust passage, a catalyst an air inlet, and an air pump. The exhaust passage is connected to the engine arranged to support a crankshaft extending along an up-down direction. The catalyst is arranged in the exhaust passage. The air inlet is arranged at a position higher than the engine inside an engine cover covering the engine. The air pump is supported by the engine. Further, the air pump is arranged to supply air taken through the air inlet to an upstream side of the catalyst in the exhaust passage.

14 Claims, 21 Drawing Sheets

EXHAUST DEVICE FOR OUTBOARD MOTOR ENGINE AND OUTBOARD MOTOR

BACKGROUND OF THE INVENTION

1. Field of the Invention

The present invention relates to an exhaust device for an outboard motor engine including an air pump arranged to feed air into an exhaust passage. The present invention also relates to an outboard motor including this exhaust device.

2. Description of Related Art

An exhaust device for a marine vessel engine according to a prior art is disclosed in U.S. Pat. No. 5,425,232. This exhaust device is provided in an engine installed inside a hull. The engine is a multi-cylinder engine. The engine is installed on a bottom of the hull such that a crankshaft extends along the front-rear direction of the hull. The engine drives a drive unit attached to the outside of a transom board.

The exhaust device is arranged to exhaust an exhaust gas of the engine into water from a propeller of the drive unit. In an inboard portion from the engine to the transom board of an exhaust passage of this exhaust device, a catalytic converter (hereinafter, simply referred to as "catalyst") is provided.

This exhaust device includes an air pump arranged to supply secondary air into the exhaust passage from a position on the upstream side of the catalyst. "Secondary air" is air which has not passed through the inside of the engine. The air pump is attached to a lower portion of the engine. In addition, the air pump is driven by the engine according to rotation of the crankshaft transmitted via a transmission belt.

SUMMARY OF THE INVENTION

The inventor of preferred embodiments of the invention described and claimed in the present application conducted an extensive study and research regarding the design and development of an exhaust device for an outboard motor engine and an outboard motor, and in doing so, discovered and first recognized new unique challenges and problems created by the interplay and trade-off relationships of the combination of various problems with exhaust devices and outboard motors. In view of the inventor's discovery of these new unique challenges and problems, the inventor further discovered and developed the preferred embodiments of the present invention, described in greater detail below, to provide unique solutions to previously unrecognized and unsolved problems.

More specifically, the inventor of the present invention considered the installation of the exhaust device for a marine vessel engine described above in an outboard motor engine. However, the above-described exhaust device is not intended to be used in a use environment of an outboard motor. In other words, an engine of an outboard motor is arranged on water by simply being covered by an engine cover. Further, the engine cover of the outboard motor prevents the engine from being splashed with water when the marine vessel runs. However, use of the above-described exhaust device in such a use environment of the outboard motor is not intended.

Therefore, when the above-described exhaust device is applied to an outboard motor engine, for example, the air pump may suction water that is splashed, together with a large amount of air. However, if the air pump suctions water together with air, the water flows into the catalyst. Therefore, the catalyst may malfunction. For example, when the outboard motor is used at sea, seawater containing salt is suctioned into the air pump. In this case, the catalyst is poisoned and deteriorates by Na, Mg, and Cl, etc., as seawater components. Also, if the catalyst at a high temperature is splashed with water, sudden shrinkage occurs and may cause the catalyst to crack.

Thus, the inventor discovered and carefully studied the many varying problems described above, and recognized certain unique and unsolved interrelationships and trade-offs, and the effects of various unique solutions on such diverse and numerous problems. After diligent research and work on such unique problems and novel potential solutions, the preferred embodiments of the present invention were discovered and developed.

A preferred embodiment of the present invention provides an exhaust device for an outboard motor engine. This exhaust device includes an exhaust passage, a catalyst an air inlet, and an air pump. The exhaust passage is connected to the engine arranged to support a crankshaft extending along an up-down direction. The catalyst is arranged in the exhaust passage. The air inlet is arranged at a position higher than the engine inside an engine cover covering the engine. The air pump is supported by the engine. Further, the air pump is arranged to supply air taken through the air inlet to an upstream side of the catalyst in the exhaust passage. Air which has not passed through the inside of the cylinders of the engine is introduced into the air pump. This air is referred to as "secondary air" sometimes in this specification.

With this configuration, even when water enters the inside of the engine cover, most of this water flows down or drops below the air inlet being at a position higher than the engine. Therefore, direct flow of water which has entered the inside of the engine cover into the air inlet is reduced. Further, suctioning of water which has entered the inside of the engine cover into the air inlet together with air is reduced. Therefore, an exhaust device for an outboard motor engine in which secondary air to be supplied into the exhaust passage by the air pump is hard to mix with water can be provided.

The air inlet may be arranged to be higher than the highest cylinder of the engine.

In addition, in a preferred embodiment of the present invention, the air pump and the exhaust passage are connected by an air introducing passage. In the air introducing passage, a check valve which is arranged to block backward flow of exhaust gas toward the air pump may be provided.

Also, in a preferred embodiment of the present invention, a transmission device is arranged on the engine. The air pump may be attached to a side portion of the engine while. Further the air pump may include a rotation shaft extending along the up-down direction. An upper end portion of the rotation shaft may be coupled to the crankshaft of the engine via the transmission device.

In a preferred embodiment of the present invention, the engine includes an exhaust gas outlet opened on a side portion of the engine, and the exhaust passage includes an upstream exhaust passage and a main exhaust passage. The upstream exhaust passage may be defined by an exhaust pipe extending along a front-rear direction of the outboard motor from the exhaust gas outlet. The main exhaust passage may be connected to a downstream end of the upstream exhaust passage and positioned below the engine. The catalyst maybe arranged in the upstream exhaust passage. The air pump may be arranged above the exhaust pipe, at a position overlapping the exhaust pipe in a plan view.

In addition, in a preferred embodiment of the present invention, the air pump and the exhaust passage are connected by an air introducing passage. The engine may be a multi-cylinder engine including a plurality of cylinders. The exhaust pipe may include upstream portions each provided for the respective cylinders, and having inlet ends connected to the plurality of cylinders, and a collecting portion which connects outlet ends of the upstream portions. The catalyst may be arranged on the downstream side of the collecting portion. The air introducing passage may be connected to the collecting portion. The air pump may be arranged above the exhaust pipe.

Also, in a preferred embodiment of the present invention, the air pump is connected to the air inlet via a U-shaped passage having a U shape in a side view.

In addition, in a preferred embodiment of the present invention, an intake passage is connected to the cylinder of the engine. The intake passage may be connected to the air inlet via the U-shaped passage.

An outboard motor of a preferred embodiment of the present invention includes an engine, an engine cover, an exhaust passage, a catalyst, an air inlet, and an air pump. The engine is arranged to support a crankshaft extending along an up-down direction. The engine cover is arranged to cover the engine. The exhaust passage is connected to the engine. The catalyst is arranged in the exhaust passage. The air inlet is arranged at a position higher than the engine inside the engine cover. The air pump is supported by the engine. Further, the air pump is arranged to supply air taken from the air inlet to the upstream side of the catalyst in the exhaust passage.

Other elements, features, steps, characteristics, and advantages of the present invention will become more apparent from the following detailed description of the preferred embodiments with reference to the attached drawings.

BRIEF DESCRIPTION OF THE DRAWINGS

FIG. 17A illustrates an initial state of an exhaust stroke, FIG. 17B illustrates propagation of a shock wave inside a branched passage, and FIG. 17C illustrates a state in which a shock wave reflected by the branched passage collides with the exhaust gas.

FIG. 22 is drawn in a state in which an exhaust pipe and a secondary air introducing pipe are partially cut-away.

DETAILED DESCRIPTION OF THE PREFERRED EMBODIMENTS

First Preferred Embodiment

Figure 1:
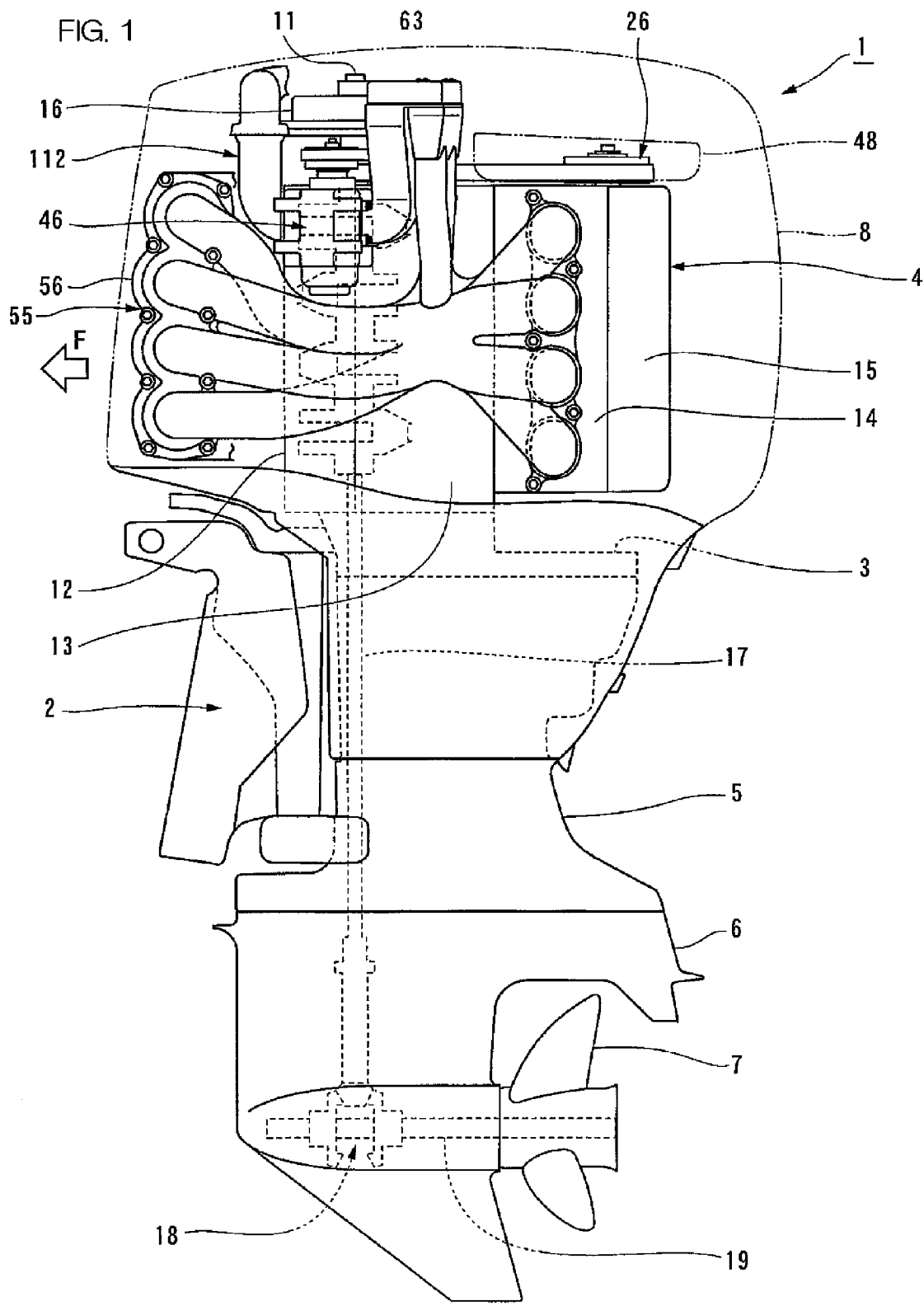
FIG. 1 is aside view of an outboard motor including an exhaust device of a first preferred embodiment of the present invention, and is drawn in a state in which the engine cover is partially omitted.

Hereinafter, an exhaust device for an outboard motor engine and an outboard motor of a first preferred embodiment of the present invention will be described in detail with reference to FIG. 1 to FIG. 21.

The outboard motor 1 of this preferred embodiment is to be attached to a transom board of a hull not shown so as to be steered and tilted via a bracket 2. Therefore, the outboard motor 1 can be in various postures with respect to the hull in an actual use state; however, in this specification, for the sake of convenience, based on a predetermined reference posture of the outboard motor 1, up-down, left-right, and front-rear directions are defined. The reference posture is a posture of the outboard motor 1 at a steering angle of zero and a tilt angle of zero with respect to the hull in the horizontal posture. In this condition, when a propulsive force in the forward drive direction is generated from the outboard motor 1, the hull moves straight ahead. In other words, in this specification, as expressions of directions of the outboard motor 1 and the respective members, the heading direction of a hull with the outboard motor 1 when it moves ahead, that is, when it moves straight ahead is simply referred to as the front of the outboard motor 1, and the side 180 degrees opposite to the front is referred to as the rear side. The left side of the hull with respect to the heading direction of the hull when the hull moves ahead is referred to as the outboard motor left side or the left side, the right side of the hull with respect to the heading direction when the hull moves ahead is referred to as the outboard motor right side or the right side. Further, the left-right direction of the outboard motor 1 when the hull moves ahead is referred to as the left-right direction of the outboard motor 1.

In the drawings, an arrow F indicating the forward side of the outboard motor 1 is shown as is appropriate.

FIG. 1 is a side view of the outboard motor 1 of the first preferred embodiment of the present invention. The outboard motor 1 includes an engine support member 3, an engine 4, an upper casing 5, a lower casing 6, a propeller 7, and a engine cover 8. The engine support member 3 is a plate-shaped member joined to the upper end of a bracket 2. On the engine support member 3, the engine 4 is mounted. In addition, to the lower portion of the engine support member 3, the upper casing 5 is attached. To the lower end of the upper casing 5, the lower casing 6 is attached. Onto the lower casing 6, the propeller 7 is supported rotatably. The engine cover 8 covers the engine 4. In FIG. 1, etc., the external shape of the engine cover 8 is indicated by a phantom line, and the internal structure is shown by a see-through engine cover 8.

The engine 4 is a four-cycle four-cylinder engine in this preferred embodiment. The engine 4 is mounted on the engine support member 3 in a posture in which the axis line of the crank shaft 11 extends along the up-down direction. Four cylinders of the engine 4 are positioned behind the crankshaft 11 (opposite side of the hull with respect to the crankshaft 11), and are aligned in series along the up-down direction. In the present preferred embodiment, among the four cylinders of the engine 4, the highest cylinder is referred to as a first cylinder #1, and cylinders below the first cylinder #1 are referred to as, in order from the top, a second cylinder #2, a third cylinder #3, and a fourth cylinder #4. In this engine 4, the first cylinder #1, the third cylinder #3, the fourth cylinder #4, and the second cylinder #2 are ignited in this order, for example.

The crankshaft 11 is arranged so as to penetrate through the engine 4 in the up-down direction. At an upper end portion of the crankshaft 11, a flywheel magneto 16 is provided. To the lower end of the crankshaft 11, a drive shaft 17 is coupled. The drive shaft 17 extends along the up-down direction from the lower end of the engine 4 to the inside of the lower casing 6. The drive shaft 17 is supported rotatably onto the engine support member 3, the upper casing 5 and the lower casing 6 by bearings (not shown). The lower end of the drive shaft 17 is coupled to a propeller shaft 19 via a forward-reverse switching mechanism 18. The propeller 7 rotates integrally with the propeller shaft 19.

Figure 2:
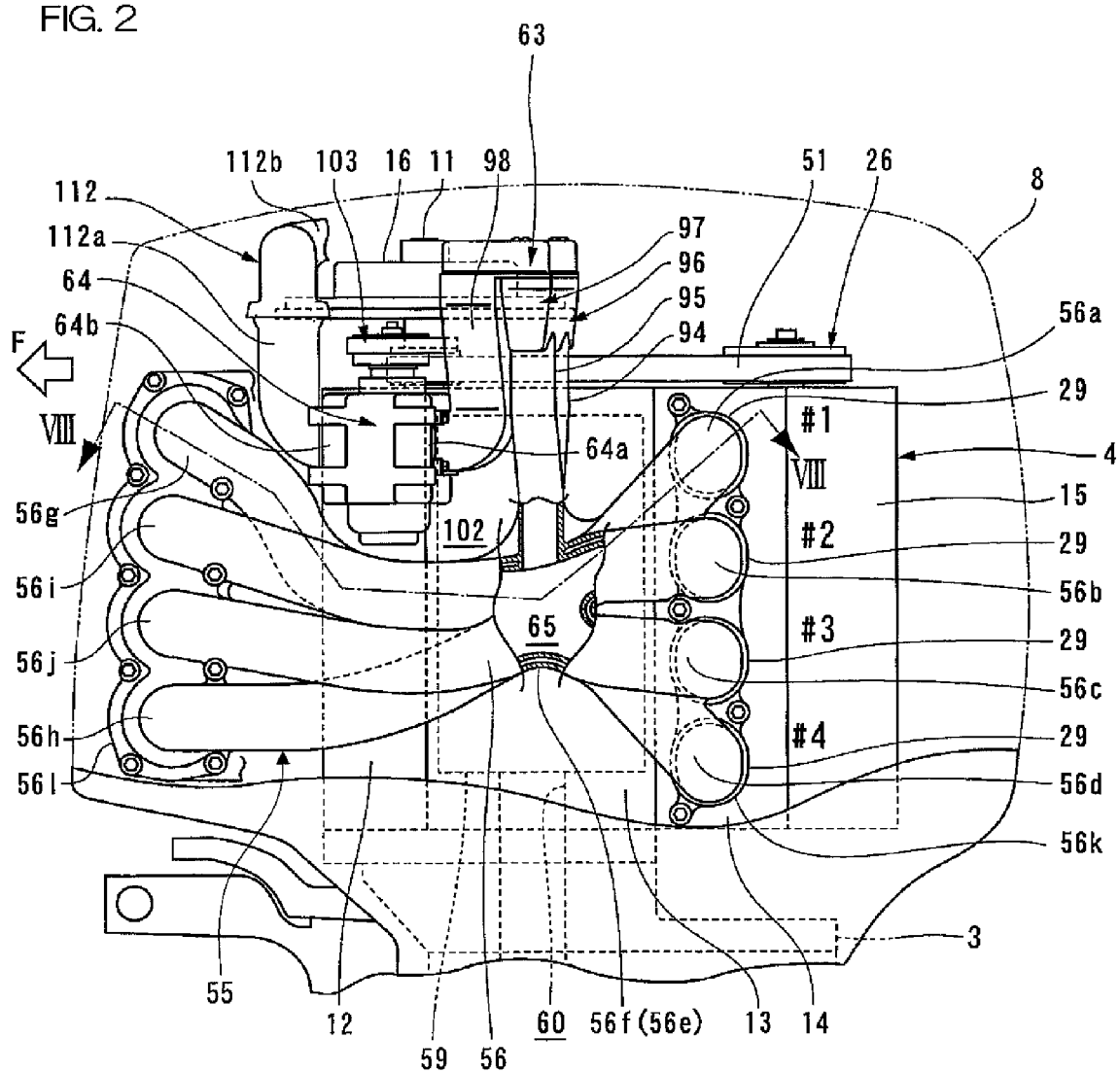
FIG. 2 is an enlarged side view of an engine section of the outboard motor.
Figure 3:
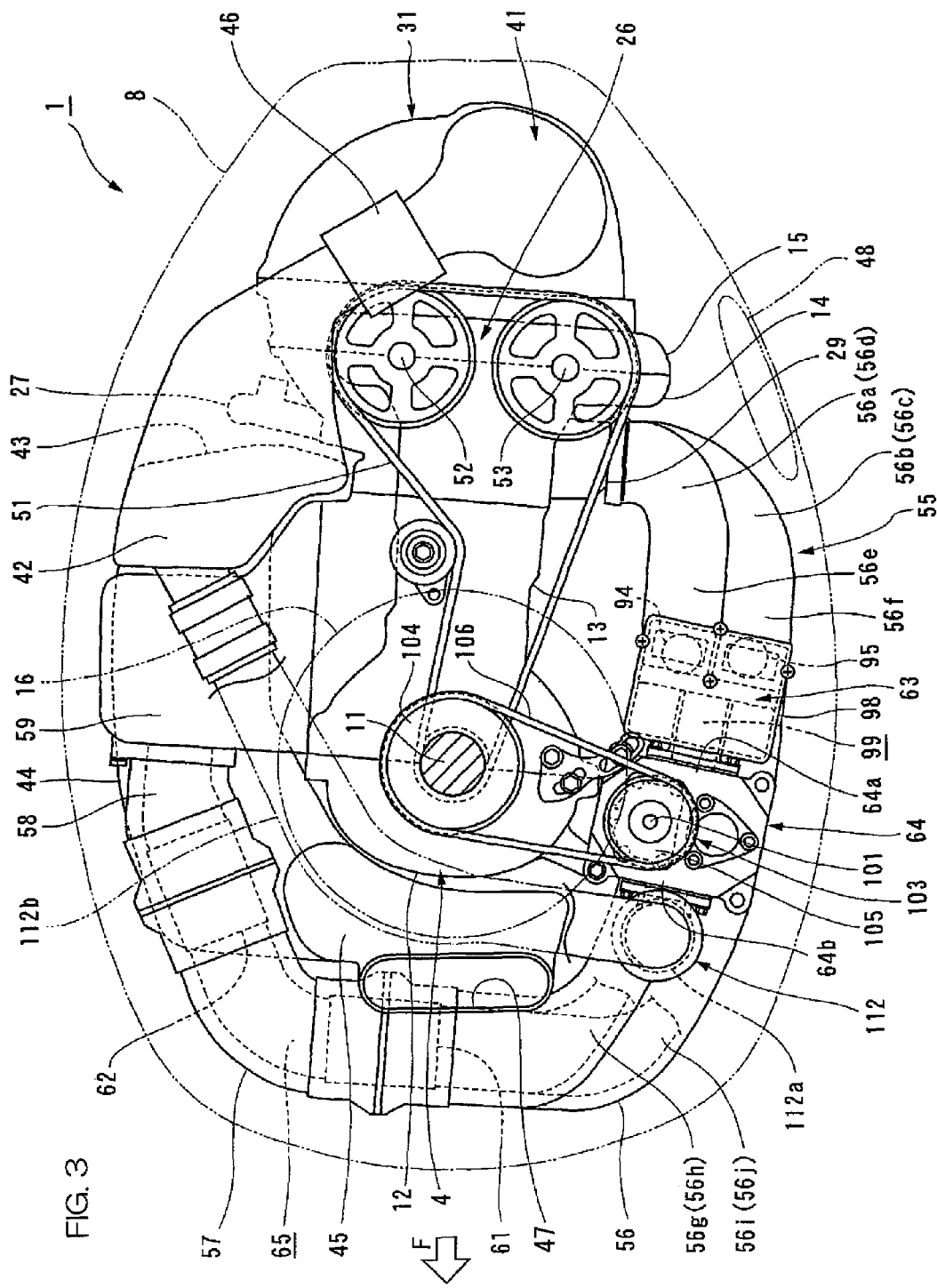
FIG. 3 is an enlarged plan view of the engine section of the outboard motor, and is drawn in a state in which a secondary air duct is partially omitted.
Figure 4:
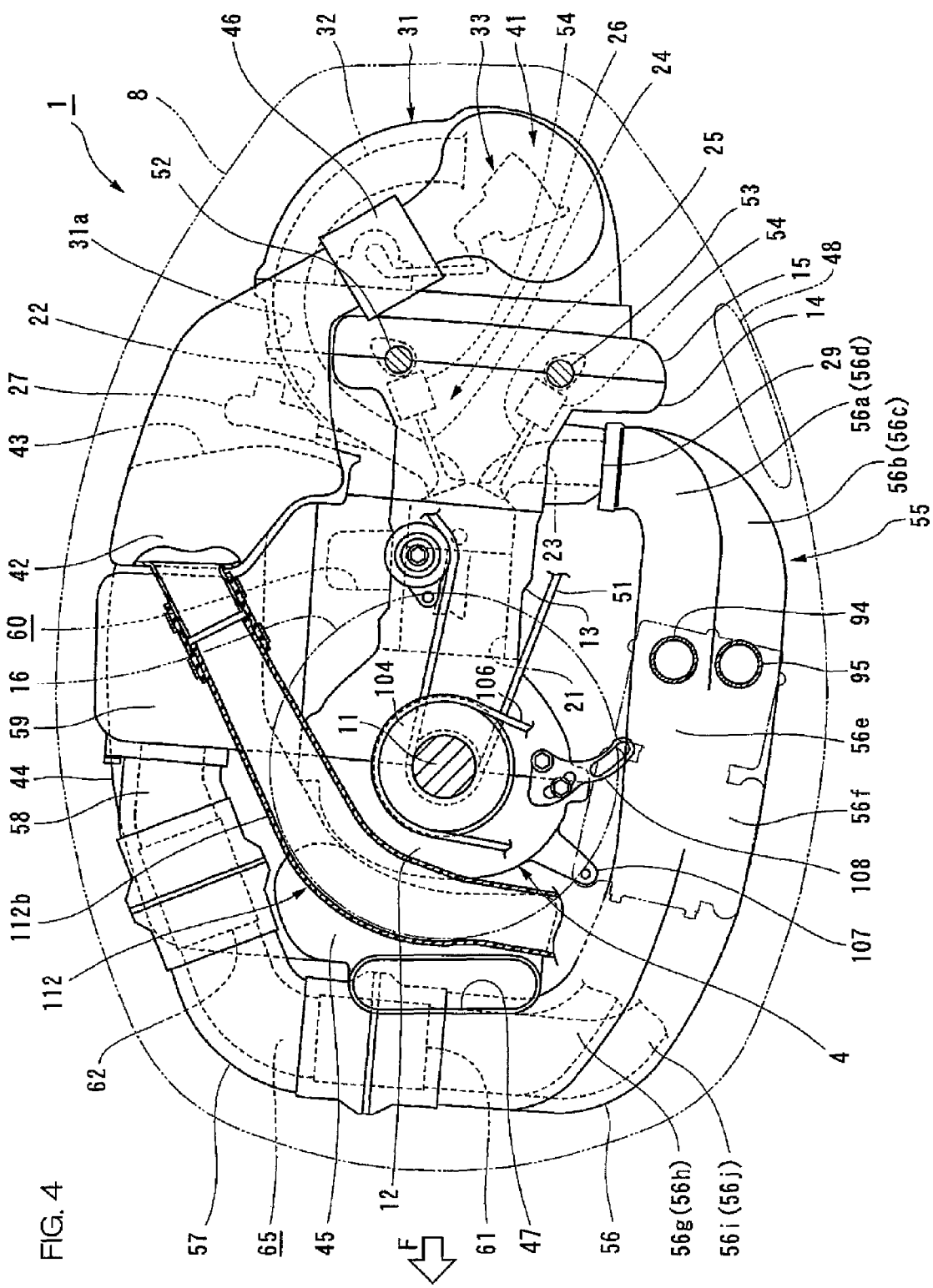
FIG. 4 is an enlarged plan view of the engine section of the outboard motor, and is drawn in a state in which a portion of a valve operating device and an air pump are omitted, and the secondary air duct and an intake duct are partially cut-away.

FIG. 2 is an enlarged side view of the engine portion, and FIG. 3 and FIG. 4 are an enlarged plan view of the engine portion, respectively. The engine 4 includes a crank case 12, a cylinder body 13, a cylinder head 14, and a head cover 15. The crank case 12 and the cylinder body 13 rotatably support the crankshaft 11. The cylinder head 14 is attached to the cylinder body 13. The head cover 15 is attached to this cylinder head 14. The crank case 12, the cylinder body 13, the cylinder head 14, and the head cover 15 are arranged in the front-rear direction of the outboard motor 1 in this order from the forward side of the outboard motor 1. In addition, the crank case 12, the cylinder body 13, the cylinder head 14, and the head cover 15 are mounted on the engine support member 3, respectively.

In the cylinder body 13, cylinders 21 (see FIG. 4) constituting first cylinder #1 to fourth cylinder #4 are provided and lined up in the up-down direction. In the cylinder head 14, as shown in FIG. 4, an intake port 22 and an exhaust port 23 preferably provided for each of the cylinders. Further, the cylinder head 14 is provided with intake valves 24 and exhaust valves 25 arranged to open and close these ports 22 and 23, respectively. The cylinder head 14 is further provided with a valve operating device 26 arranged to drive the intake valve 24 and exhaust valve 25 and an injector 27 for each cylinder arranged to inject fuel into the corresponding intake port 22.

As shown in FIG. 4, the valve operating device 26 includes an intake cam shaft 52 and an exhaust cam shaft 53, and a valve lifter 54. As shown in FIG. 3, to the intake cam shaft 52 and the exhaust cam shaft 53, rotation of the crankshaft 11 is transmitted by a timing belt 51. In addition, driving forces of the intake cam shaft 52 and the exhaust cam shaft 53 are transmitted to the intake valve 24 and the exhaust valve 25 by the valve lifter 54, respectively.

The intake ports 22 are provided at the side portion on the outboard motor right side of the cylinder head 14, that is, at the side portion on the opposite side of the exhaust ports 23 in the left-right direction of the outboard motor 1 as shown in FIG. 4. The intake ports 22 extend toward the outboard motor rear side, that is, toward the head cover 15 side so as to separate from the crank case 12. The respective inlet end of the intake ports 22 is connected to corresponding intake pipes 32 inside an intake surge tank 31 arranged behind the head cover 15. The intake surge tank 31 is arranged at the rear end of the engine 4. The rear end of the engine 4 is an end on the opposite side of the crank case 12 in a plan view.

The exhaust ports 23 open on the outer portion (side portion on the outboard motor left side) in the left-right direction of the outboard motor 1 of the cylinder head 14, and are connected to an exhaust device 55 as shown in FIG. 4. The openings of the exhaust ports 22 define exhaust gas outlets 29. The exhaust gas outlets 29 open toward the left side of the outboard motor 1 on the left side surface of the cylinder head 14. In other words, the exhaust gas outlets 29 are opened toward the opposite direction of the intake ports 21 in the left-right direction of the outboard motor 1.

As shown in FIG. 4, the exhaust device 55 includes a first exhaust pipe 56, a second exhaust pipe 57, a third exhaust pipe 58, an exhaust chamber 59, and a main exhaust passage 60. An upstream end of the first exhaust pipe 56 is connected to the exhaust gas outlets 29. The second exhaust pipe 57 is connected to a downstream end of the first exhaust pipe 56. The third exhaust pipe 58 is connected to a downstream end of the second exhaust pipe 57. The exhaust chamber 59 is connected to a downstream end of the third exhaust pipe 58. The main exhaust passage 60 is arranged so as to extend downward from a downstream end portion of the exhaust chamber 59.

In the present preferred embodiment, the upstream exhaust passage 65 is defined by a space provided inside the first to third exhaust pipes 56 to 58 and the exhaust chamber 59. In the present preferred embodiment, the exhaust passage of the engine 4 is defined by the upstream exhaust passage 65 and the main exhaust passage 60. In the present preferred embodiment, an exhaust pipe extending in the front-rear direction of the outboard motor is defined by the first exhaust pipe 56.

Figure 5:
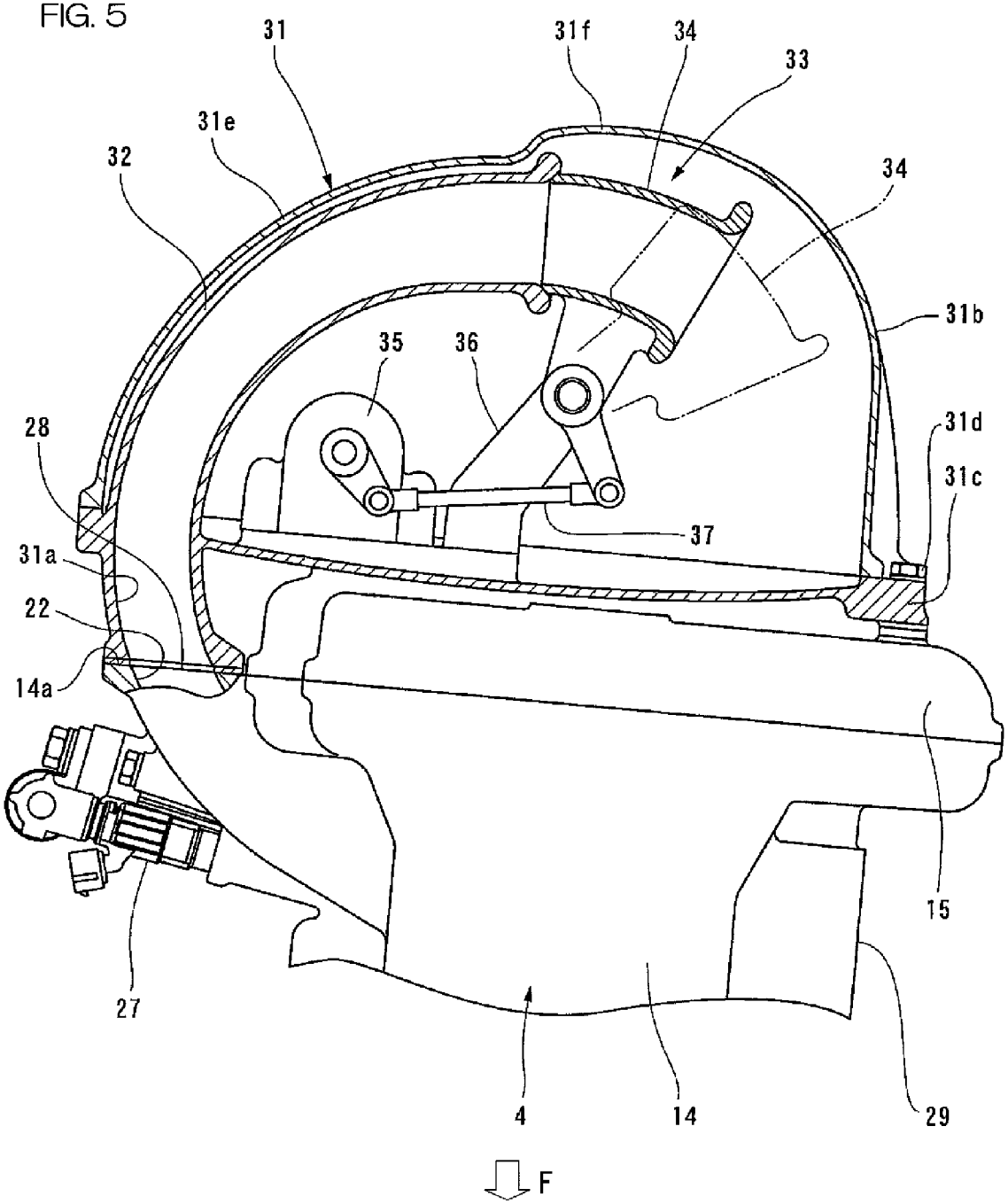
FIG. 5 is a sectional view of an intake surge tank section.

FIG. 5 is a sectional view for describing a configuration relating to the intake surge tank 31. The inlet ends of the intake ports 22 open on the end on the outboard motor right side of the rear surface 14a of the cylinder head 14 (a surface to which the head cover 15 is connected). The openings of the inlet ends of the intake ports 22 define intake inlets 28 of the engine 4. The intake inlets 28 are provided on the opposite sides of the exhaust gas outlets 29 in the left-right direction of the outboard motor 1. The intake inlets 28 are connected to intake holes 31a of the intake surge tank 31 attached to the rear surface 14a of the cylinder head 14. The intake holes 31a are connected to the respective intake pipes 32 inside the intake surge tank 31.

The intake surge tank 31 has a box-shaped intake surge tank main body 31b opening toward the front of the outboard motor 1 (head cover 15 side), and an attaching member 31c which closes the opening portion of the intake surge tank main body 31b. The intake surge tank 31 is attached to the head cover 15 with attaching bolts 31d, for example.

The intake pipes 32 are arranged so as to extend while curving in an arc shape in a plan view. In detail, the intake pipes 32 curve so as to project to the rear side (upper side in FIG. 5) of the outboard motor 1, that is, in the opposite direction of the crank case 12 with respect to the cylinder head 14 from the intake inlets 28. The intake pipes 32 curve so as to project to the left side (right side in FIG. 5) of the outboard motor 1, that is, come closer to the exhaust ports 23 (see FIG. 4) in the left-right direction of the outboard motor 1. The intake pipes 32 are extended along the side wall 31e on the outboard motor right side and the rear wall 31f of the suction surge tank main body 31b inside the intake surge tank 31. The intake pipes 32 open within an end portion on the outboard motor rear side inside the intake surge tank 31.

The intake hole 31a and the intake pipe 32 are provided for each cylinder, and define an intake passage for each cylinder in cooperation with the intake port 22 of each cylinder. The inlet ends of the intake pipes 32 define intake ports for intake to the engine 4. As described below, intake passages extend to the head cover 15 side, such that the length of the intake passages can be secured while the exhaust passage is formed to be long.

At the inlet ends of the intake pipes 32, a variable intake pipe mechanism 33 is provided. The variable intake pipe mechanism 33 includes an auxiliary intake pipe 34 removably connected to the intake pipes 32, and a pair of servo motors 35 which drives the auxiliary intake pipes 34. The auxiliary intake pipe 34 is provided for each intake pipe 32 of each cylinder. These auxiliary intake pipes 34 are pivotally supported on a support bracket 36 such that they can move between the connecting position shown by the solid line in FIG. 5 and the separated position shown by a phantom line in FIG. 5.

Figure 7:
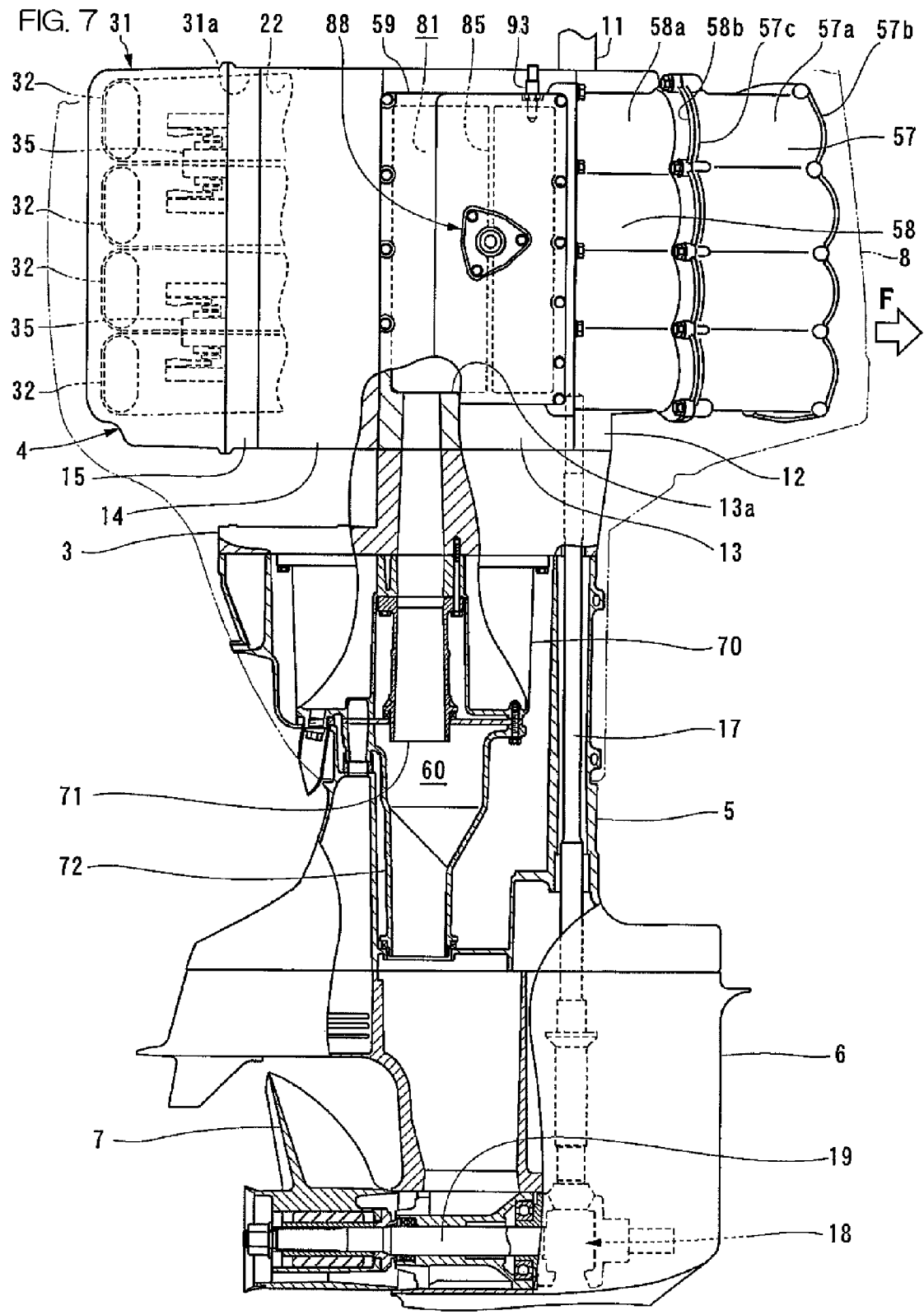
FIG. 7 is a sectional view for describing a configuration of an exhaust system.

These auxiliary intake pipes 34 are joined to the servo motors 35 via links 37. These auxiliary intake pipes 34 are driven to turn by the servo motors 35 to be moved to the connecting position or the separated position. By disposing the auxiliary intake pipes 34 at the connecting position, the intake pipe length becomes relatively long. Also, by moving the auxiliary intake pipes 34 to the separated position, the intake pipe length becomes relatively short. The servo motors 35 are provided at the upper portion and the lower portion of the head cover 15, respectively, as shown in FIG. 7. The servo motor 35 positioned on the upper side drives the first cylinder auxiliary intake pipe 34 and the second cylinder auxiliary intake pipe 34, and the servo motor 35 positioned on the lower side drives the third cylinder auxiliary intake pipe 34 and the fourth cylinder auxiliary intake pipe 34.

To the upper end of the intake surge tank 31, as shown in FIG. 3, an intake duct 41 is connected. The intake duct 41 is arranged to lead the air inside the engine cover 8 to the intake port of the engine 4 (the inlet end of the intake pipes 32 opening inside the intake surge tank 31). In the present preferred embodiment, a U-shaped passage having a U shape in a side view is defined by the intake duct 41. That is, this intake duct 41 preferably has a U shape as viewed from the outboard motor right side as shown in the side view of FIG. 6. The intake duct 41 includes a downstream side horizontal portion 42, a downstream side vertical portion 43, an upstream side horizontal portion 44, and an upstream side vertical portion 45.

Figure 6:
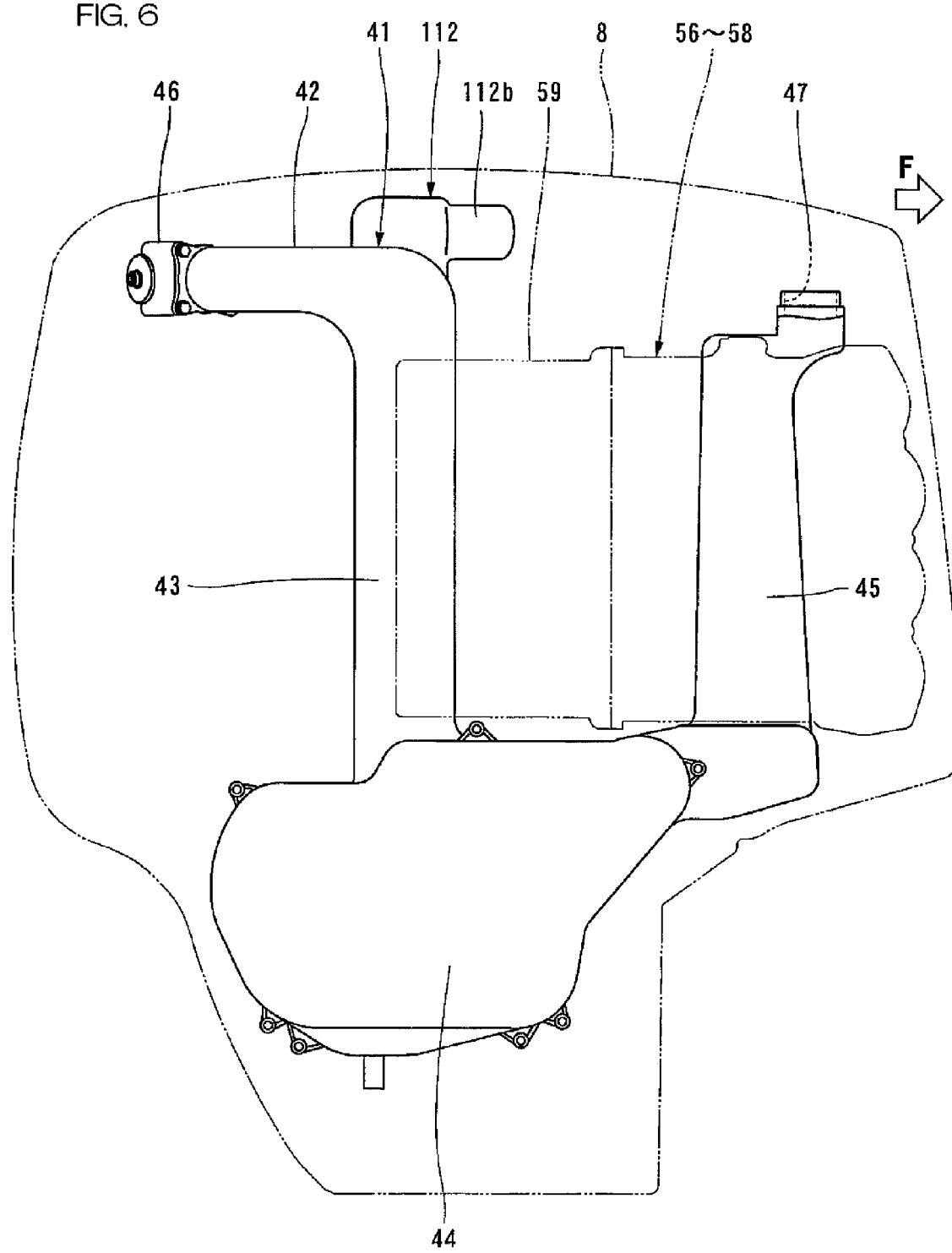
FIG. 6 is a side view of the intake duct.

As shown in FIG. 4, the downstream side horizontal portion 42 extends in the front-rear direction on the upper rear right side of the engine 4, and the downstream side end portion of the downstream side horizontal portion 42 is connected to an upper end portion of the intake surge tank 31. In the downstream side horizontal portion 42, a throttle valve 46 is provided. As shown in FIG. 4, the downstream side vertical portion 43 is positioned on the lateral right side of the engine 4. The downstream side vertical portion 43 extends downward to the vicinity of the lower end portion of the engine 4 from the front end portion of the downstream side horizontal portion 42. As shown in FIG. 6, the upstream side horizontal portion 44 extends forward from the lower end portion of the downstream side vertical portion 43. In addition, the upstream side vertical portion 45 extends upward from the front end portion of the upstream side horizontal portion 44 to the height of the vicinity of the upper end portion of the engine 4.

As shown in FIG. 6, at the upper end portion of the upstream side vertical portion 45, an air suction port 47 is provided. This air suction port 47 has a tubular shape extending in the up-down direction. An opening shape of the air suction port 47 is oval long in the left-right direction of the outboard motor 1 as shown in FIG. 4. The air suction port 47 is connected to the intake surge tank 31 via the intake duct 41. In addition, as shown in FIG. 5, the intake surge tank 31 is connected to intake passages of the respective cylinders defined by intake holes 31a, intake pipes 32, and intake ports 22. Therefore, the intake passages of the respective cylinders are connected to the air suction port 47 via the intake duct 41 which defines a U-shaped passage in the present preferred embodiment.

The air suction port 47 is arranged at an upper end portion on the outboard motor front side inside the engine cover 8 surrounding the engine 4. In detail, as shown in FIG. 4, the air suction port 47 is arranged at the upper end portion of the center in the left-right direction of the outboard motor 1 between an end portion on the outboard motor front side of the crank case 12 and the engine cover 8 in a plan view. Also, this air suction port 47 is arranged at a position higher than the engine 4. The position higher than the engine 4 is higher than the highest cylinder (first cylinder #1) of the engine 4 in the present preferred embodiment.

The space inside the engine cover 8 communicates with the atmosphere via an air inlet 48 (see FIG. 1 and FIG. 3) provided on the rear portion on the outboard motor left side of the engine cover 8. As shown in FIG. 1, this air inlet 48 is arranged at substantially the same height as the upper end portion of the engine 4. Air introduced into the inside of the engine cover 8 from the air inlet 48 is suctioned into the intake duct 41 from the air suction port 47 of the intake duct 41, and suctioned into the intake passages of the respective cylinders through the intake duct 41 and the intake surge tank 31.

FIG. 7 is a sectional view for describing a configuration of an exhaust system. The main exhaust passage 60 opens in water at the shaft center of the propeller 7. The main exhaust passage 60 preferably includes a plurality of members. Specifically, the plurality of members of the main exhaust passage 60 include a cylinder body 13 of the engine 4, an engine support member 3, an oil pan 70 attached to the lower end of this engine support member 3, and a pipe 71 attached to the oil pan 70. Further, the plurality of members of the main exhaust passage 60 include a muffler 72 which is attached to the lower end of the oil pan 70 and extends downward, the upper casing 5 which houses this muffler 72, and the lower casing 6.

Figure 8:
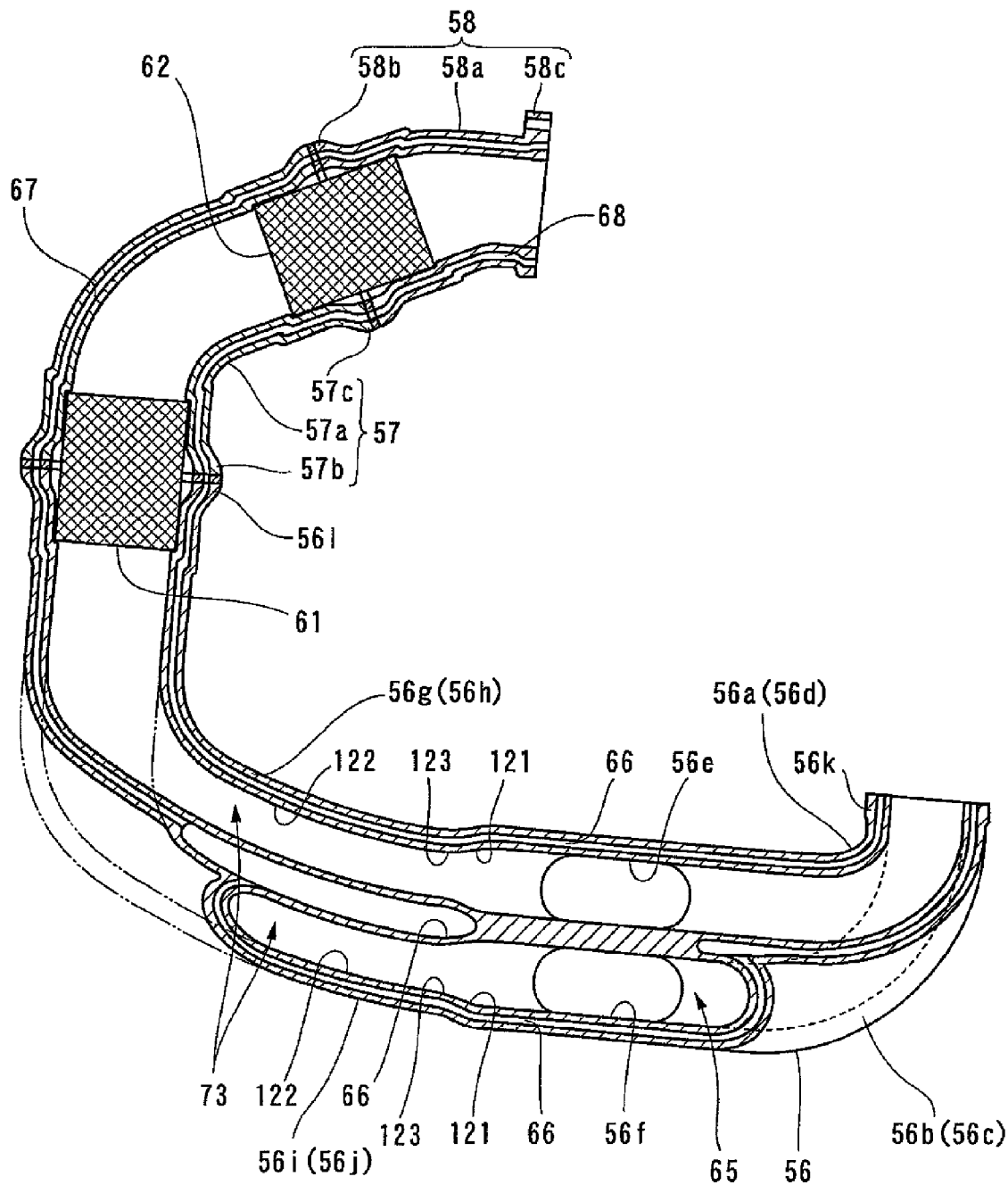
FIG. 8 is a sectional view of an exhaust pipe along VIII-VIII of FIG. 2.

FIG. 8 is a sectional view of an exhaust pipe along VIII-VIII of FIG. 2. The first to third exhaust pipes 56 to 58 are molded preferably by casting into pipe shapes, respectively, for example. The first exhaust pipe 56 has a double pipe structure in which the upstream exhaust passage 65 is covered by a coolant passage 66. The second and third exhaust pipes 57 and 58 also have the same double pipe structure as the first exhaust pipe 56, formed preferably by casting, for example. The coolant passage 66 provided inside the first exhaust pipe 56 communicates with a coolant passage (not shown) of the cylinder head 14. The coolant passage 66 is connected to the coolant passage 69 (see FIG. 9) inside the exhaust chamber 59 via the coolant passages 67 and 68 inside the second exhaust pipe 57 and the third exhaust pipe 58.

Inside the connecting portion between the first exhaust pipe 56 and the second exhaust pipe 57, a first catalyst 61 is provided. In addition, inside the connecting portion between the second exhaust pipe 57 and the third exhaust pipe 58, a second catalyst 62 is provided. The first and second catalysts 61 and 62 preferably are made of a so-called ternary catalyst, for example. The ternary catalyst can detoxify hydrocarbon, nitrogen oxide, and carbon monoxide at the time of combustion near a theoretical air-fuel ratio at the same time. The first catalyst 61 is arranged on the opposite side of the crank case 12 across the air suction port 47 as shown in FIG. 3 and FIG. 4. In other words, the first catalyst 61 is arranged on the further front of the outboard motor 1 than the air suction port 47 in a plan view.

As shown in FIG. 2, the first exhaust pipe 56 collects exhaust gases exhausted from the four exhaust gas outlets 29 of the cylinder head 14 at two points, and further distributes the exhaust gases to four points (four second exhaust pipes 57). In detail, the first exhaust pipe 56 includes four upstream portions 56a to 56d, two collecting portions (first and second collecting portions 56e and 56f), and four downstream portions (first to fourth downstream portions 56g to 56j).

Inlet ends of the four upstream portions 56a to 56d are connected to the exhaust gas outlets 29 of the four cylinders. An outlet end of the first cylinder upstream portion 56a and an outlet end of the fourth cylinder upstream portion 56d are connected to the first collecting portion 56e. An outlet end of the second cylinder upstream portion 56b and an outlet end of the third cylinder upstream portion 56c are connected to the second collecting portion 56f. In other words, to the first collecting portion 56e, the first and fourth cylinder upstream portions 56a and 56d which are respectively connected to the first cylinder #1 and the fourth cylinder #4 to be ignited in ignition periods 360 degrees different from each other are connected. In addition, to the second collecting portion 56f, the second and third cylinder upstream portions 56b and 56c respectively connected to the second cylinder #2 and the third cylinder #3 to be ignited in ignition periods 360 degrees different from each other are connected. The first and second downstream portions 56g and 56h are connected to the first collecting portion 56e so as to branch from the first collecting portion 56e. Also, the third and fourth downstream portions 56i and 56j are connected to the second collecting portion 56f so as to branch from the second collecting portion 56f.

The first and fourth cylinder upstream portions 56a and 56d are arranged closer to the engine 4 in the left-right direction of the outboard motor 1 than the second and third cylinder upstream portions 56b and 56c as shown in FIG. 4. Therefore, the first collecting portion 56e is provided at a position closer to the engine 4 than the second collecting portion 56f. The first collecting portion 56e and the second collecting portion 56f are disposed at substantially the same height as that of the central portion in the up-down direction of the cylinder body 13 as shown in FIG. 2. Accordingly, the pipe length of the first cylinder upstream portion 56a and the pipe length of the fourth cylinder upstream portion 56d can be made equal to each other. Also, the pipe length of the second cylinder upstream portion 56b and the pipe length of the third cylinder upstream portion 56c can be made equal to each other.

The first and fourth cylinder upstream portions 56a and 56d are preferably longer than the second and third cylinder upstream portions 56b and 56c in a side view shown in FIG. 2. On the other hand, the second and third cylinder upstream portions 56b and 56c are preferably constructed such that the radius of curvature of the bent portions for connection to the cylinder head 14 become higher than the radius of curvature of the first and fourth cylinder upstream portions 56a and 56d as shown in FIG. 3 and FIG. 4. With this configuration, the first cylinder and fourth cylinder upstream portions 56a and 56d and the second cylinder and third cylinder upstream portions 56b and 56c are preferably constructed such that their pipe lengths match each other.

At the inlet ends of the first to fourth cylinder upstream portions 56a to 56d, as shown in FIG. 2, an upstream side attaching flange 56k arranged to attach the first exhaust pipe 56 to the cylinder head 14 is formed integrally. The inlet ends of the first to fourth cylinder upstream portions 56a to 56d are connected to each other by the upstream side attaching flange 56k.

On the other hand, the first downstream portion 56g extends substantially horizontally forward of the outboard motor 1 to a position corresponding to the front end edge of the crank case 12 in a side view from the first collecting portion 56e as shown in FIG. 2. Further, the first downstream portion 56g extends forward to the diagonally upper side from the position corresponding to the front end edge of the crank case 12 in a side view. Also, the second downstream portion 56h is gradually inclined forward and downward as it goes to the forward side of the outboard motor 1 to the position corresponding to the front end edge of the crank case 12 in a side view from the first collecting portion 56e. Further, the second downstream portion 56h extends substantially horizontally forward from a portion corresponding to the front end edge of the crank case 12 in a side view. The third and fourth downstream portions 56i and 56j extend substantially horizontally forward of the outboard motor 1 to positions overlapping the crank case 12 in a side view from the second collecting portion 56f. Further, the third and fourth downstream portions 56i and 56j are respectively inclined forward and upward from the positions overlapping the crank case 12 in a side view.

As shown in FIG. 2, an outlet end portion of the third downstream portion 56i is arranged below an outlet end portion of the first downstream portion 56g. Also, the fourth downstream portion 56j positioned below the third downstream portion 56i is arranged above the second downstream portion 56h. As shown in FIG. 4, the outlet end portions of the first to fourth downstream portions 56g to 56j are bent toward the center in the left-right direction of the outboard motor 1.

As shown in FIG. 2, at the outlet ends of the first to fourth downstream portions 56g to 56i, a downstream side attaching flange 56l arranged to attach the second exhaust pipe 57 is formed integrally. The outlet ends of the first to fourth downstream portions 56g to 56i are connected to each other by the downstream side attaching flange 56l.

The second exhaust pipe 57 is connected to the first exhaust pipe 56 ahead of the crank case 12, that is, on the opposite side of the cylinder head 14 with respect to the crank case 12 as shown in FIG. 3 and FIG. 4. The second exhaust pipe 57 is arranged to extend to the diagonally right front of the engine 4. The second exhaust pipe 57 is formed preferably by integrally molding by casting the four tubular portions 57a and two flanges 57b and 57c respectively positioned on the upstream side ends and the downstream side ends of these tubular portions 57a as shown in FIG. 7 and FIG. 8, for example.

The third exhaust pipe 58 is disposed on the lateral right side of the engine 4, that is, at a position adjacent aside the crank case 12 as shown in FIG. 3 and FIG. 4. This third exhaust pipe 58 extends in the front-rear direction of the outboard motor 1, that is, a direction in which the crank case 12 and the cylinder body 13 are lined up. Then, this third exhaust pipe 58 connects the second exhaust pipe 57 to the exhaust chamber 59. The exhaust chamber 59 is positioned on the lateral right side of the cylinder body 13, that is, on the opposite side of the first exhaust pipe 56 in the left-right direction of the outboard motor 1. This third exhaust pipe 58 is formed preferably by integrally molding by casting the four tubular portions 58a and two flanges 58b and 58c respectively positioned on the upstream side ends and the downstream side ends of these tubular portions 58a as shown in FIG. 7 and FIG. 8, for example.

As shown in FIG. 4, these first to third exhaust pipes 56 to 58 extend from the exhaust gas outlets 29 in a plan view. Further, the first to third exhaust pipes 56 to 58 define a bypass exhaust pipe which extends along the crank case 12 in the vicinity of the outside (vicinity of the front) of the crank case 12, and bypasses the engine 4 and extends to the opposite side in the left-right direction of the outboard motor 1 (right side of the outboard motor 1). Preferably, the length of the first to third exhaust pipes 56 to 58 (the bypass exhaust pipe) is designed so as to surround the crankshaft 11 at angles not less than 90 degrees in the rotation direction of the crankshaft 11.

As shown in FIG. 4, the upstream exhaust passage 65 inside the first to third exhaust pipes 56 to 58 and the intake passage on the downstream side of the intake surge tank 31 are formed into a substantially S shape in a plan view. The intake passage on the downstream side of the intake surge tank 31 is preferably an intake passage formed inside the intake pipe 32, the intake hole 31a, and the intake port 22. The first to third exhaust pipes 56 to 58 and the intake passage may be formed into a mirror-reversed S shape in a plan view (that is, an S shape in a bottom view). This mirror-reversed S shape is also included in one mode of "S shape." In other words, the first to third exhaust pipes 56 to 58 and the intake passage extend opposite to each other in the left-right direction of the outboard motor from the cylinder head 14. Then, the intake passage curves so as to bypass the cylinder head 14 at the rear portion of the outboard motor. On the other hand, the bypass exhaust pipe defined by the first to third exhaust pipes 56 to 58 curves so as to bypass the engine 4 to the front of the crank case 12 at the front portion of the outboard motor.

Figure 9:
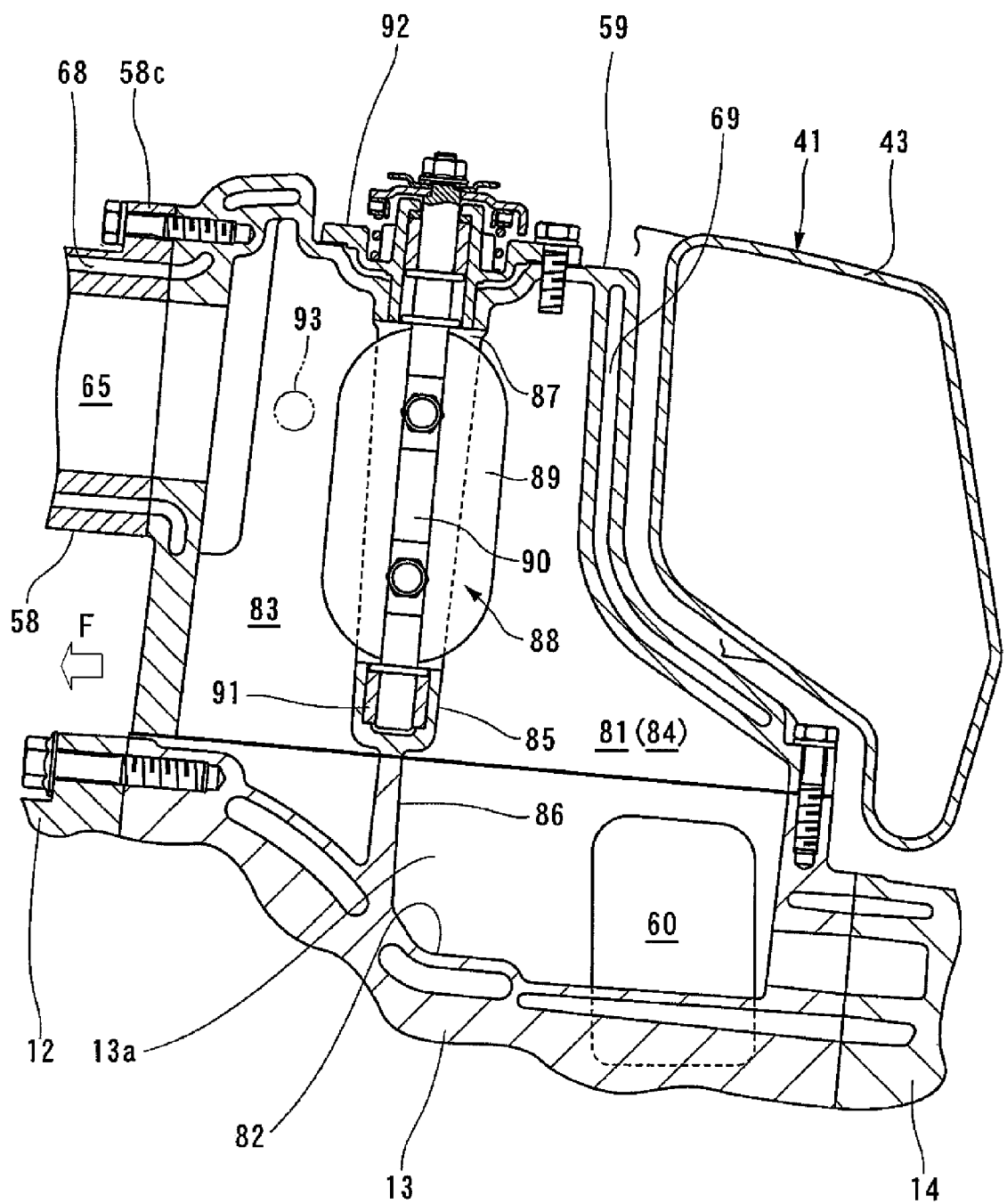
FIG. 9 is a sectional view of an exhaust chamber.

FIG. 9 is a sectional view of the exhaust chamber 59. The exhaust chamber 59 preferably has a box shape which opens to the cylinder body 13. The exhaust chamber 59 is attached to the side portion on the outboard motor right side of the cylinder body 13 such that the opening portion of the exhaust chamber is closed by the cylinder body 13. On the side portion of the cylinder body 13, a recess portion 82 which opens to the exhaust chamber 59 (to the right side of the outboard motor 1) is provided. The recess portion 82 defines an expansion chamber 81 in conjunction with the exhaust chamber 59. Accordingly, the expansion chamber 81 has a capacity larger than the inner space of the exhaust chamber 59. On the lower wall 13a of the cylinder body 13 which defines the side wall on the lower side of the recess portion 82, as shown in FIG. 7 and FIG. 9, the main exhaust passage 60 opens.

As shown in FIG. 6, near the lower side of the exhaust chamber 59, the upstream side horizontal portion 44 of the intake duct 41 is positioned. Also, as shown in FIG. 9, on the opposite side (near the rear side) of the third exhaust pipe 58 of the exhaust chamber 59, the downstream side vertical portion 43 of the intake duct 41 is positioned. In addition, as shown in FIG. 7, the exhaust chamber 59 preferably has a height in the up-down direction that is longer than the width in the front-rear direction to allow the four third exhaust pipes 58 to be connected thereto.

As shown in FIG. 9, inside the outer wall of the exhaust chamber 59, a coolant passage 69 is provided. The coolant passage 69 is arranged such that a coolant is supplied from the coolant passage 68 of the third exhaust pipe 58. Also, the coolant passage 69 is arranged so as to discharge a coolant supplied from the coolant passage 68 of the third exhaust pipe 58 to a coolant discharge passage (not shown) of the cylinder body 13.

As shown in FIG. 9, inside the exhaust chamber 59, a partition 85 arranged to partition the expansion chamber 81 into an upstream exhaust gas chamber 83 and a downstream exhaust gas chamber 84 is provided. This partition 85 partitions the expansion chamber 81 into the two chambers 83 and 84 in cooperation with a longitudinal wall 86 stood on the cylinder body 13. In this partition 85, a communicating hole 87 which makes communication between both gas chambers 83 and 84 is provided. Further, the partition 85 is provided with an on-off valve 88 which opens and closes the communicating hole 87. The communicating hole 87 positions at the central portion in the up-down direction of the partition 85 at the central portion of the partition 85 with respect to the left-right direction of the outboard motor 1. The opening shape of the communicating hole 87 preferably is preferably an ellipse shape that allows the valve body 89 of the on-off valve 88 to be inserted therein.

The on-off valve 88 is a butterfly valve having a disk-shaped valve body 89 inserted inside the communicating hole 87. The valve body 89 preferably includes an elongated oval plate in the left-right direction of the partition 85. This valve body 89 is attached to a valve shaft 90 extending along the partition 85. The valve shaft 90 is pivotally supported by a bearing 91 and a cover 92 fixed to the partition 85. In addition, the valve shaft 90 is connected to a drive device not shown via a wire, and rotates according to driving of the drive device.

The on-off valve 88 is driven by the drive device so as to close when the crankshaft 11 rotates in reverse or a high negative pressure is generated in the exhaust chamber 59, and opens in other cases. A sensor (not shown) for detecting the rotating speed of the crankshaft 11 detects whether the crankshaft 11 has rotated in reverse. Also, the pressure inside the exhaust chamber 59 is detected by a pressure sensor not shown.

In addition, as shown in FIG. 7, at the upper end of the exhaust chamber 59, an oxygen sensor 93 is provided to detect the amount of oxygen in the exhaust gas. The oxygen sensor 93 is positioned at an upper end portion of the upstream exhaust gas chamber 83. The oxygen sensor 93 detects an amount of oxygen in the exhaust gas flowing inside the upstream exhaust gas chamber 83. Then, the oxygen sensor 93 sends the detected amount of oxygen as detection data to an ECU (Electronic Control Unit, not shown) of the engine 4. This ECU controls the fuel injection amount of the injector 27 and the ignition timing of the ignition plug (not shown), etc., based on the speed of the engine 4, the opening degree of the throttle valve 46, and the amount of oxygen in the exhaust gas detected by the oxygen sensor 93, etc.

Next, a secondary air introducing pipe 63 and an air pump 64 will be described. As shown in FIG. 2, the exhaust device 55 further includes the secondary air introducing pipe 63 and the air pump 64. The secondary air introducing pipe 63 is connected to the first and second collecting portions 56e and 56f. Also, the air pump 64 is connected to the first and second collecting portions 56e and 56f via the secondary air introducing pipe 63. Into the first and second collecting portions 56e and 56f, secondary air is introduced via the secondary air introducing pipe 63. "Secondary air" is air which has not passed through the insides of the cylinders 21 of the engine 4.

Figure 10:
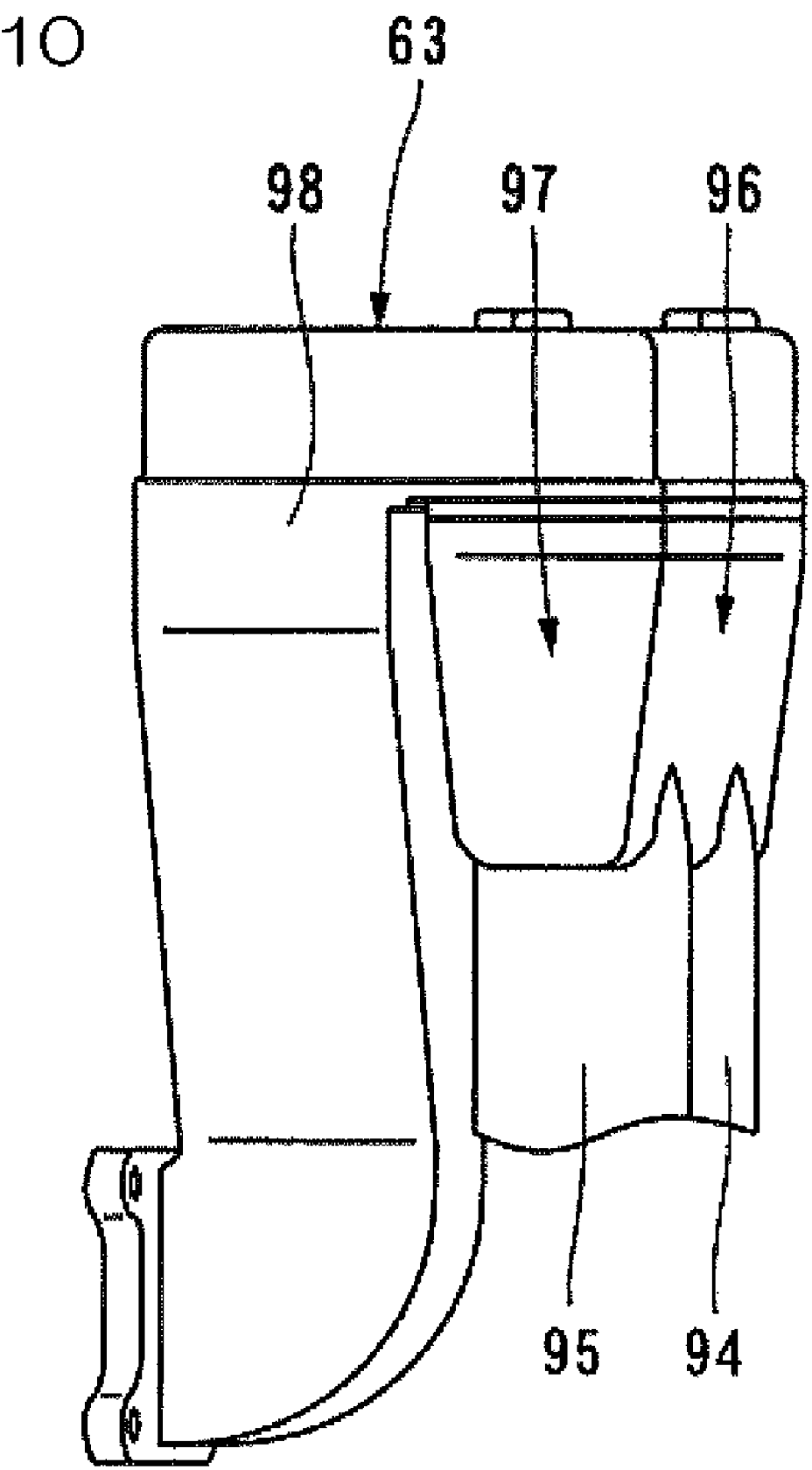
FIG. 10 is a side view illustrating a portion of a secondary air introducing pipe.

As shown in FIG. 2 and FIG. 10, the secondary air introducing pipe 63 includes a first pipe 94, a second pipe 95, first and second reed valves 96 and 97, and a third pipe 98. The first and second pipes 94 and 95 extend upward from the first and second collecting portions 56e and 56f, respectively. The first pipe 94 is formed preferably by casting integrally with the first collecting portion 56e, and the second pipe 95 is formed preferably by casting integrally with the second collecting portion 56f, for example.

The first and second reed valves 96 and 97 are provided in upper end portions of the first and second pipes 94 and 95, respectively. The first and second reed valves 96 and 97 are connected to the air pump 64 by the third pipe 98. The first and second reed valves 96 and 97 prevent the exhaust gas from flowing backward from the first exhaust pipe 56 to the air pump 64. In other words, the first and second reed valves 96 and 97 allow only secondary air from the air pump 64 to flow to the side of the first and second pipes 94 and 95 from the third pipe 98 side. In the present preferred embodiment, the first and second reed valves 96 and 97 function as check valves to prevent exhaust gas from flowing backward toward the air pump 64.

As shown in FIG. 2, the third pipe 98 is arranged forward of the first and second pipes 94 and 95 of the outboard motor 1. This third pipe 98 extends along the up-down direction. An upper end portion (outlet end portion) of the third pipe 98 is arranged so as to cover the first and second reed valves 96 and 97 from above. Also, a lower end portion (inlet end portion) of the third pipe 98 is connected to an air discharge portion 64a of the air pump 64. Inside the third pipe 98, only one air passage 99 (see FIG. 3) is defined. The width of this air passage 99 (width in the left-right direction of the outboard motor 1) becomes gradually wider as it goes from the lower end portion to the upper end portion of the third pipe 98.

The secondary air discharged from the air pump 64 is distributed to the first and second reed valves 96 and 97 through the air passage 99. Then, the secondary air supplied to the first reed valve 96 is fed into the first collecting portion 56e through a first pipe 94. In addition, the secondary air supplied to the second reed valve 97 is fed into the second collecting portion 56f through a second pipe 95. In the present preferred embodiment, a secondary air introducing passage is defined by the first to third pipes 94, 95, and 98 and the first and second reed valves 96 and 97.

Figure 11A:
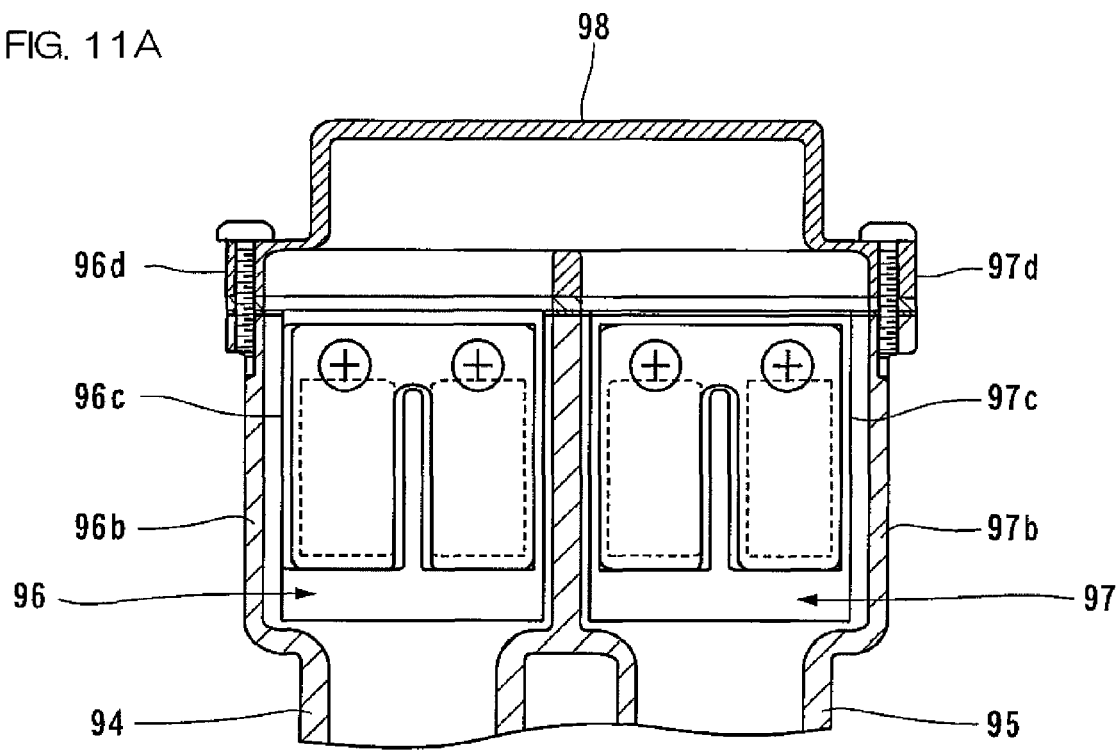
FIG. 11A is a cross sectional view of reed valves.
Figure 11B:
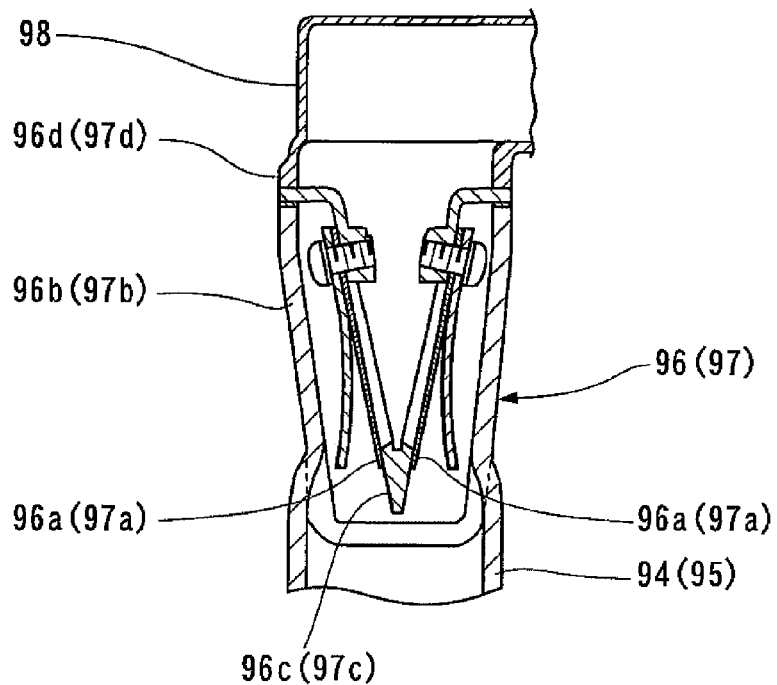
FIG. 11B is a longitudinal sectional view of the same.

FIG. 11A is a cross sectional view of the reed valves 96 and 97, and FIG. 11B is a longitudinal sectional view of the reed valves 96 and 97. The first reed valve 96 includes a valve housing 96b formed integrally with an upper end portion of the first pipe 94 and a reed valve body 96c inserted in the valve housing 96b. Also, the second reed valve 97 includes a valve housing 97b formed integrally with an upper end portion of the second pipe 95 and a reed valve body 97c inserted in the valve housing 97b. To upper end portions of the first and second reed valves 96 and 97, the third pipe 98 is attached.

Figure 12:
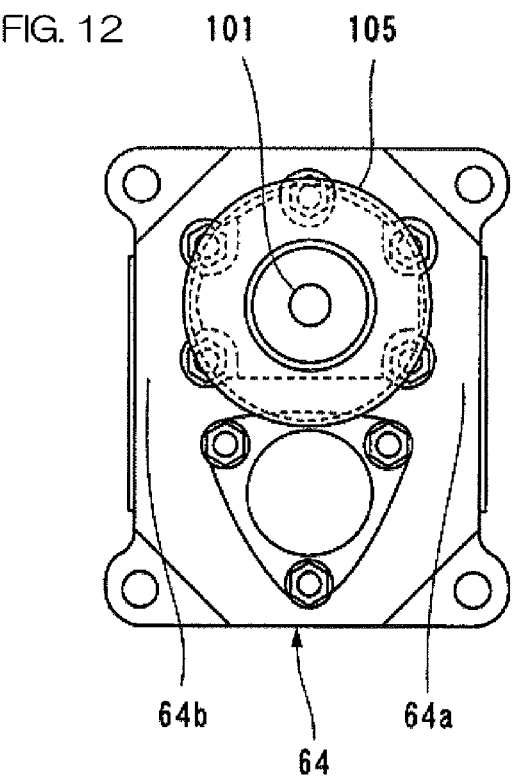
FIG. 12 is a plan view of the air pump.
Figure 13:
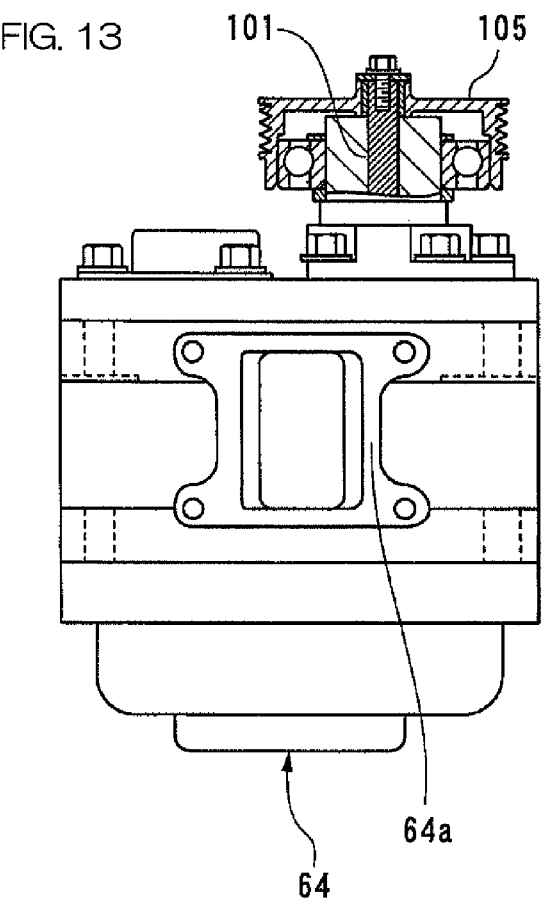
FIG. 13 is a side view illustrating the air pump viewed from an air discharge portion side, and is drawn in a state in which a connecting portion between a rotation shaft and a driven pulley is cut-away.

FIG. 12 is a plan view of the air pump. In addition, FIG. 13 is a side view illustrating the air pump viewed from the air discharge portion side, and is drawn in a state in which the connection portion between a rotation shaft 101 and a driven pulley 105 is cut-away. The air pump 64 preferably is a roots blower in the present preferred embodiment. The air pump 64 suctions air from the air suctioning portion 64b along with rotation of the rotation shaft 101, and discharges air from the air discharge portion 64a. As shown in FIG. 3, the air pump 64 is supported on one side portion of the engine 4 such that the rotation shaft 101 extends along the up-down direction. The position to which the air pump 64 is attached is an end portion on the outboard motor left front side of the upper end portion of the engine 4 as shown in FIG. 2 and FIG. 3. The air pump 64 is attached to the engine 4 in a state in which the air suctioning portion 64b is positioned on the outboard motor front side, and the air discharge portion 64a is positioned on the outboard motor rear side.

The air pump 64 is arranged between the engine 4 and the engine cover 8 above the first exhaust pipe 56. In detail, as shown in FIG. 2 and FIG. 3, the air pump 64 is arranged above the first and third downstream portions 56g and 56i provided in the first exhaust pipe 56, at a position overlapping the first and third downstream portions 56g and 56i in a plan view. In the present preferred embodiment, an exhaust pipe extending in the front-rear direction of the outboard motor from the exhaust gas outlets are defined by the first exhaust pipe 56.

As shown in FIG. 2, the first and second collecting portions 56e and 56f are arranged at a height which is substantially the center in the up-down direction of the engine 4. In other words, the first and second collecting portions 56e and 56f are positioned to be lower than the exhaust gas outlets 29 of the first cylinder #1 and the second cylinder #2. Also, the first and third downstream portions 56g and 56i are inclined so as to gradually rise as they go toward the downstream side from the first and second collecting portions 56e and 56f. Therefore, an upper portion of the first exhaust pipe 56 has a substantially U shape opened upward in a side view as shown in FIG. 2. The air pump 64 is accommodated in a recess 102 having a U shape in a side view formed on the upper portion of the first exhaust pipe 56.

Figure 14:
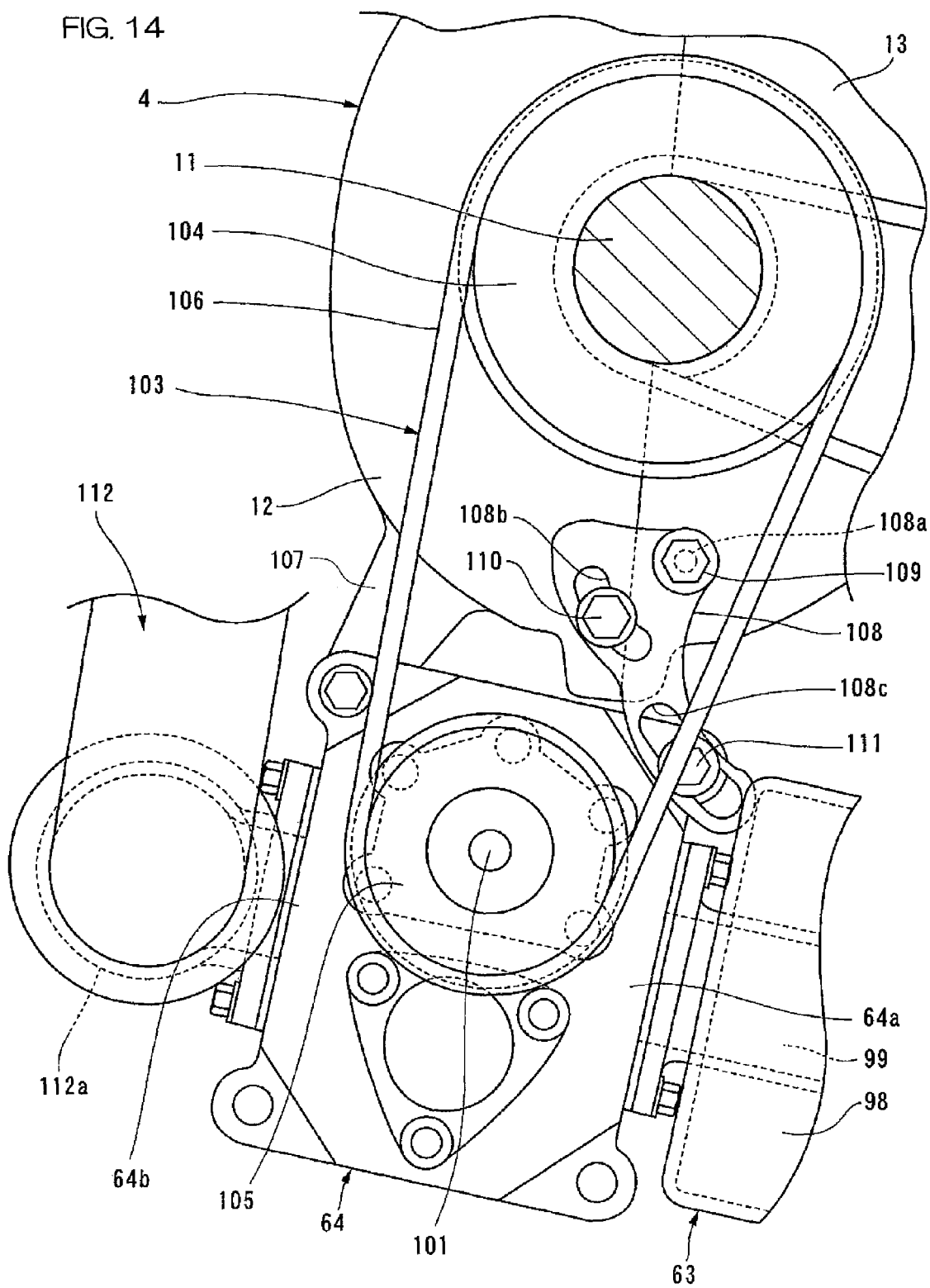
FIG. 14 is an enlarged plan view of an attaching portion of the air pump.

FIG. 14 is an enlarged plan view illustrating an attaching portion of the air pump 64. The rotation shaft 101 of the air pump 64 is coupled to the crankshaft 11 via a belt transmission device 103. The belt transmission device 103 includes a drive pulley 104 attached to the crankshaft 11, a driven pulley 105 attached to the rotation shaft 101, and a belt 106 wound around the pulleys 104 and 105. As shown in FIG. 2, the transmission device 103 is arranged at a position higher than the timing belt 51 provided in the valve operating device 26 near the engine 1. When the engine operates, the rotation of the crankshaft 11 is always transmitted to the rotation shaft 101. Therefore, the air pump 64 always rotates when the engine operates. The rotation speed (secondary air discharge amount) of the air pump 64 increases or decreases according to the engine speed.

In addition, as shown in FIG. 14, the air pump 64 is attached to the engine 4 at the above-described attaching position by an air pump attaching seat 107 and an air pump support bracket 108 provided on the crank case 12. The bracket 108 is attached to the upper surfaces of the crank case 12 and the cylinder body 13 by two bolts 109 and 110, for example, from above while the distal end portion (pump attaching portion) of the bracket 108 projects to the lateral of the engine 4. Also, the distal end portion (pump attaching portion) of the bracket 108 is attached to an end portion on the outboard motor rear side of the air pump 64 by a bolt 111, for example.

In the bracket 108, through holes 108a, 108b, and 108c through which the bolts 109, 110, and 111 are respectively inserted are formed. The through hole 108a has an arc shape around the bolt 109 so as to make adjustable the position of the bracket 108 with respect to the engine 4. The through hole 108c formed in the distal end portion (pump attaching portion) of the bracket 108 has an arc shape in a plan view so as to make adjustable the position of the bracket 108 with respect to the air pump 64. Therefore, the air pump 64 is attached to the engine 4 so as to make adjustable the tension of the belt 106.

As shown in FIG. 3, the air suctioning portion 64b of the air pump 64 is connected to the downstream side vertical portion 43 of the intake duct 41 via a secondary air duct 112. Therefore, the air pump 64 is connected to the air suction port 47 via the intake duct 41. As shown in FIG. 2, the secondary air duct 112 includes a vertical portion 112a and a horizontal portion 112b. The vertical portion 112a is positioned ahead of the air pump 64. The vertical portion 112a extends to a position higher than the engine 4 from the air suctioning portion 64b of the air pump 64. In addition, as shown in FIG. 3, the horizontal portion 112b is positioned above the engine 4. The horizontal portion 112b extends substantially horizontally from an upper end portion of the vertical portion 112a to the intake duct 41. A portion (upper portion in FIG. 3) positioned on the outboard motor right side of the crank shaft 11 in the horizontal portion 112b is gradually inclined rearward as it goes to the outboard motor right side. As shown in FIG. 6, an inlet end portion of the horizontal portion 112b is connected to an upper end portion of the downstream side vertical portion 43 of the intake duct 41.

By connecting the inlet end portion of the secondary air duct 112 to the intake duct 41, the air inside the intake duct 41 can be suctioned into the air pump 64. The air suctioned into the air pump 64 can be supplied into the first exhaust pipe 56. Accordingly, the air inside the intake duct 41 can be supplied as secondary air into the first exhaust pipe 56. In the present preferred embodiment, the air suction port 47 of the intake duct 41 substantially defines an air inlet of the air pump 64.

Next, supersonic nozzles 73 provided in the first exhaust pipe 56 will be described. As shown in FIG. 8, in the first to fourth downstream portions 56g to 56j, supersonic nozzles 73 are provided, respectively. The supersonic nozzle 73 is arranged to accelerate the flow rate of exhaust gas from a flow rate not more than a sonic speed to a supersonic speed. The supersonic nozzle 73 maybe a De Laval nozzle. The Laval nozzle has a flow passage structure in which a sectional area of a flow path is first reduced then increased.

The supersonic nozzle 73 has, as shown in FIG. 8, a narrowing portion 121, an expanding portion 122, and a throat portion 123. The narrowing portion 121 is arranged such that the passage cross-section area is gradually reduced toward the downstream side of the flow direction of the exhaust gas. In addition, the expanding portion 122 is arranged such that the passage cross-section area gradually increases toward the downstream side. The expanding portion 122 is curved so as to gradually come closer to the center in the left-right direction of the outboard motor 1 as it goes to the downstream side. The throat portion 123 is positioned between the narrowing portion 121 and the expanding portion 122. The throat portion 123 has the smallest passage cross-section area in the supersonic nozzle 73.

As shown in FIG. 8, the inner diameter at the upstream end of the narrowing portion 121 matches the inner diameter of the first and second collecting portions 56e and 56f of the first exhaust pipe 56. An inner diameter of a downstream side end portion of the first exhaust pipe 56, that is, an inner diameter of a portion on the downstream side of the expanding portion 122 gradually increases as it goes to the downstream side. An inner diameter of a downstream end of the expanding portion 122 is equal to inner diameters of the downstream portions 56g to 56j of the first exhaust pipe 56. Accordingly, the exhaust pipe inner surface can be connected without steps to the first catalyst 61 with a relatively large outer diameter. The downstream side end of the first exhaust pipe 56 bends toward the center in the left-right direction of the outboard motor 1, that is, toward the first catalyst 61.

Figure 15:
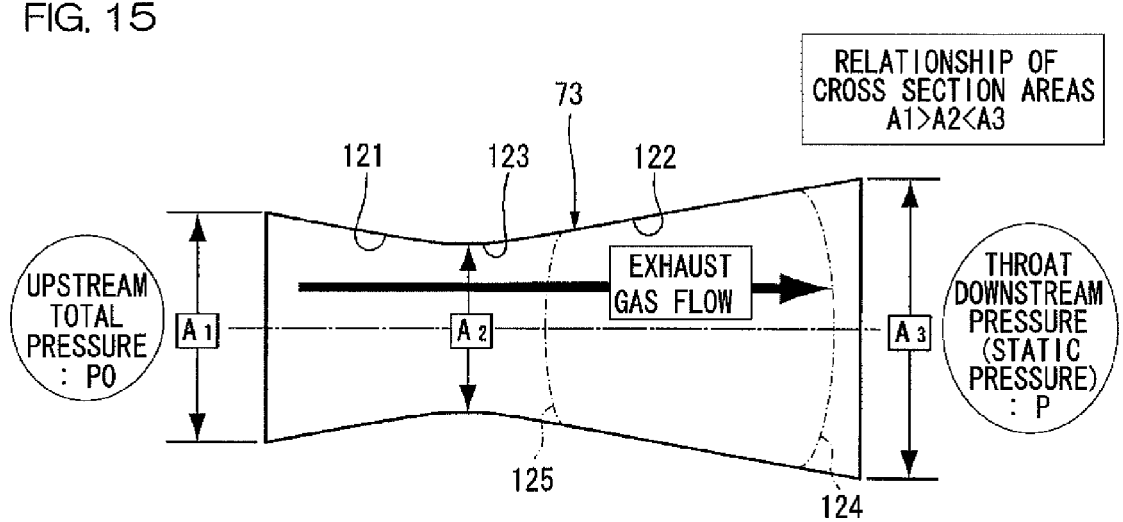
FIG. 15 is a view illustrating a configuration of a supersonic nozzle.

FIG. 15 is a view for describing in detail the flow channel structure of the supersonic nozzle 73. The cross-section area at the upstream end of the narrowing portion 121 (left end in FIG. 15) is referred to as "upstream cross-section area A1," and the cross-section area at the expanding portion 122 (right end in FIG. 15) of the downstream portion is referred to as "downstream side cross-section area A3." In addition, the cross-section area of the throat portion 123 is referred to as "throat cross-section area A2." These areas satisfy the relationship of A1>A2<A3. In other words, the upstream cross-section area A1 and the downstream cross-section area A3 are larger than the throat cross-section area A2.

The narrowing portion 121, the expanding portion 122, and the throat portion 123 are formed such that their sectional shapes (shapes as viewed from the upstream side of the upstream exhaust passage 65) are circular or substantially circular, for example.

In this preferred embodiment, the narrowing portion 121 and the expanding portion 122 are formed so as to assume a tapered pipe configuration whose rate of change in cross-section area is fixed, that is, whose cross-section area changes linearly. However, the supersonic nozzle 73 to be used in this exhaust device 55 is not limited to this shape, and may be shaped such that the rate of change in cross-section area gradually changes.

The supersonic nozzle 73 is preferably formed so as to satisfy the conditions shown in the following mathematical formulas (1) and (2). Accordingly, when the flow rate of the exhaust gas flowing into the throat portion 123 reaches mach 1 (sonic speed), in the expanding portion 122, the exhaust gas can be accelerated to a higher speed.

$$\frac{dM}{dx} = \frac{\Lambda}{1-M^2} \quad (1)$$

$$\Lambda \equiv M\left[1+\frac{\gamma-1}{2}M^2\right]\left[\frac{\gamma M^2}{2}\left(\frac{4f}{D}\right)-\frac{1}{A}\frac{dA}{dx}\right] \quad (2)$$

The mathematical formula (1) shows the relationship between the shape of the exhaust pipe and the mach number in a primary flow with viscous friction. The mathematical formula (2) defines $\Lambda$ in the mathematical formula (1).

In these mathematical formulas, M denotes a mach number, A denotes the flow channel cross-section area at an arbitrary cross section of the exhaust pipe, D denotes a pipe corresponding diameter at the arbitrary cross section, $\gamma$ denotes a specific heat ratio, x denotes the distance (position) in the flow direction, and f denotes a friction coefficient.

Figure 16:
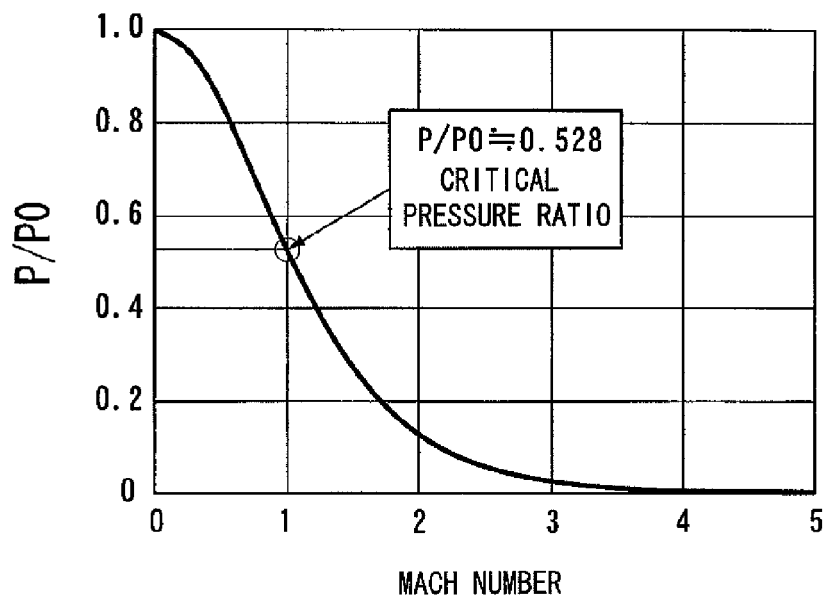
FIG. 16 is a graph illustrating a relationship between a pressure ratio and a mach number of the supersonic nozzle.

FIG. 16 is a view showing the relationship of the mach number with the ratio (P/P0) of the total pressure (P0) of the upstream of the inlet of the supersonic nozzle 73 and the static pressure (P) of the downstream of the throat portion 123. As is understood from this figure, the mach number reaches "1" under a condition that the pressure ratio (P/P0) is smaller than the critical pressure ratio of 0.528. In other words, according to a rise in the upstream total pressure (P0) to make the pressure ratio (P/P0) smaller than the critical pressure ratio of 0.528, the flow rate of the exhaust gas passing through the narrowing portion 121 is accelerated and the flow rate of the exhaust gas flowing into the throat portion 123 reaches the sonic speed.

When the flow rate of the exhaust gas flowing into the throat portion 123 thus reaches the sonic speed, as shown in FIG. 15, a shock wave 124 is generated inside the supersonic nozzle 73. In addition, this shock wave 124 is accelerated when passing through the expanding portion 122 of the supersonic nozzle 73. When the shock wave 124 is thus generated, inside the throat portion 123, a shock wave 124 and an expansion wave 125 (shown in FIG. 15) composed of a pressure wave advancing opposite to the shock wave 124 are generated.

While the shock wave 124 is accelerated in the expanding portion 122 of the supersonic nozzle 73, the expansion wave 125 advances opposite to the shock wave 124. Accordingly, an excessive negative pressure is generated between the shock wave 124 and the expansion wave 125. As a result, the temperature of the exhaust gas between the shock wave 124 and the expansion wave 125 lowers.

The shock wave 124 and the expansion wave 125 propagate inside the first exhaust pipe 56 positioned on the upstream side of the first catalyst 61. Therefore, a negative pressure is generated inside the first exhaust pipe 56, and the temperature of the exhaust gas inside the first exhaust pipe 56 lowers. In addition, a negative pressure is generated inside the first exhaust pipe 56, and the exhaust gas is easily discharged from the exhaust port 23 into the exhaust passage 65 in the exhaust stroke of the engine 4. In addition, the secondary air discharged from the air pump 64 easily flows into the first exhaust pipe 56.

Figure 17A:
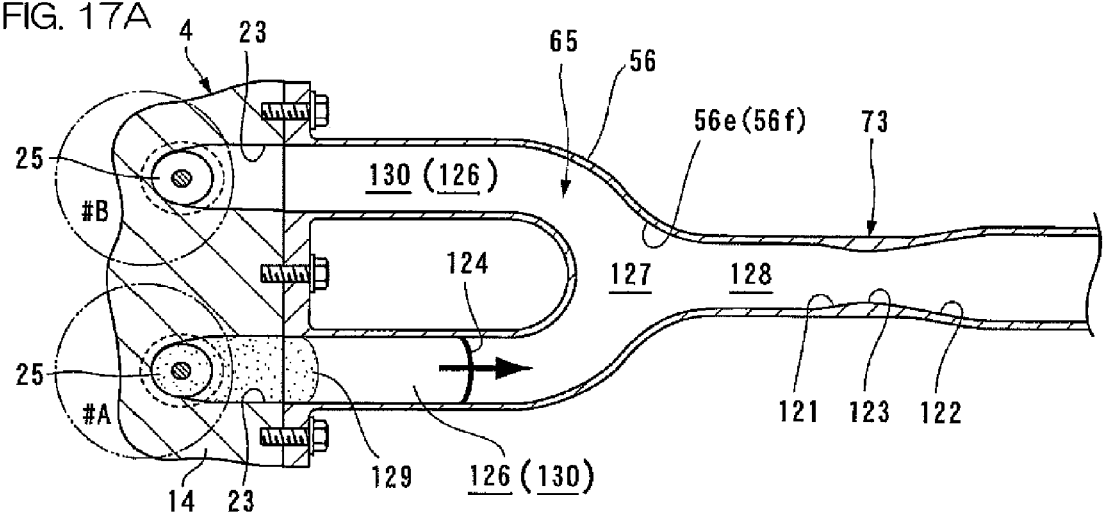
FIG. 17A, FIG. 17B, and FIG. 17C are sectional views for describing progressing states of a shock wave and exhaust gas.
Figure 17B:
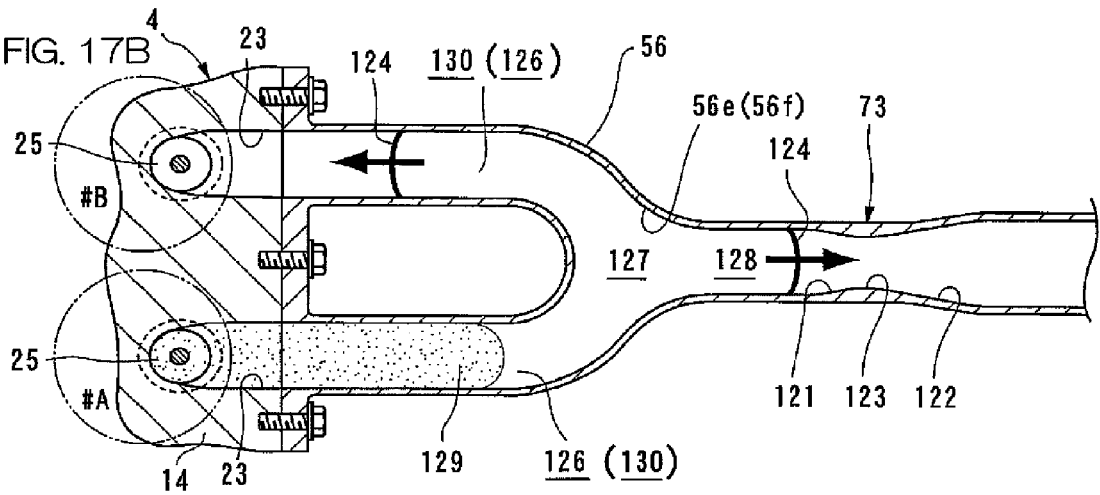
Figure 17C:
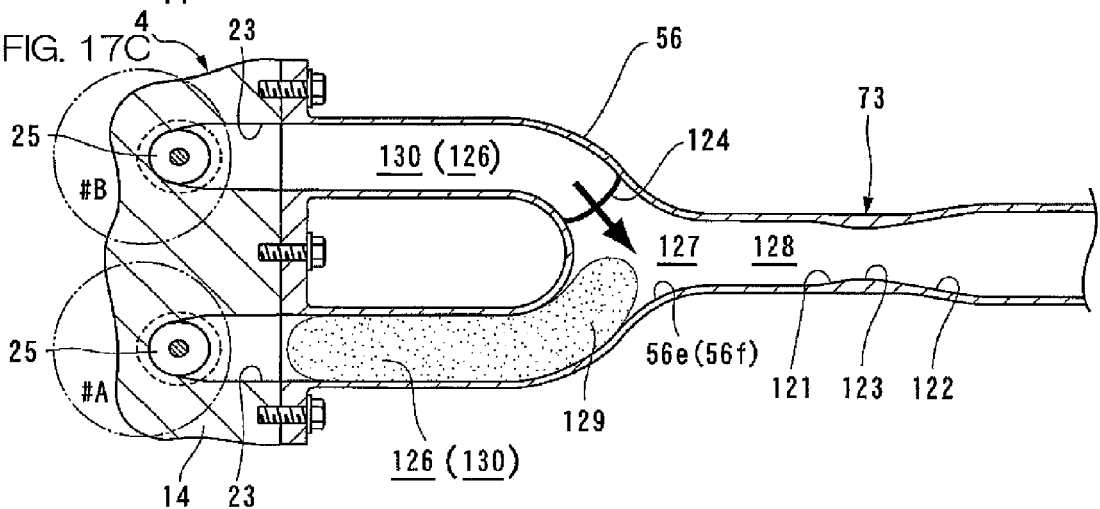

FIG. 17A to FIG. 17C are sectional views for describing progressing states of a shock wave 124 and exhaust gas. In FIG. 17A to FIG. 17C, in the upstream exhaust passage 65, only upstream portions 126 of the respective cylinders connected to a pair of cylinders which are ignited in ignition periods 360 degrees different from each other, and one downstream portion 128 connected to these upstream portions 126 via a collecting portion 127, are illustrated. In the present preferred embodiment, the engine 4 preferably is a four-cylinder engine, and the engine has two pairs of cylinders. That is, one pair is a pair of the first cylinder #1 and the fourth cylinder #4. Also, the other pair is a pair of the second cylinder #2 and the third cylinder #3. In FIG. 17A to FIG. 17C, the pair of cylinders are drawn as a cylinder #A and a cylinder #B.

In this exhaust device 55 according to the present preferred embodiment, as shown in FIG. 17A to FIG. 17C, a shock wave 124 propagating in the upstream exhaust passage 65 and the first to fourth cylinder upstream portions 56a to 56d are used during the exhaust stroke. Accordingly, a condition for making the flow rate of the exhaust gas reach the sonic speed in the super sonic nozzle 73, that is, the condition that the pressure ratio (P/P0) becomes smaller than the critical pressure ratio of about 0.528 is easily satisfied.

As shown in FIG. 17A, in the cylinder #A, when the exhaust valve 25 opens during the exhaust stroke, a combustion gas with a high pressure (exhaust gas 129) jets out into the exhaust port 23 from the combustion chamber.

The flow rate of the combustion gas jetting out into the exhaust port 23 increases according to the opening degree of the exhaust valve 25, and reaches the sonic speed before the exhaust valve 25 becomes its full-open state. When the flow rate of the exhaust gas 129 thus reaches the sonic speed, a supersonic shock wave 124 is generated inside the exhaust port 23. At this time, as shown in FIG. 17A, the shock wave 124 advances from the inside of the exhaust port 23 into the first exhaust pipe 56, that is, inside the upstream portion 126 of the upstream exhaust passage 65, and further propagates at a high speed toward the downstream. On the other hand, the exhaust gas 129 advances to the downstream side at a relatively low speed inside the upstream portions 126 behind the shock wave 124.

The shock wave 124 advancing in the first exhaust pipe 56 is branched into the downstream portion 128 and the upstream portion on the cylinder #B side (hereinafter, referred to as "branched passage 130") as shown in FIG. 17B when it passes through the collecting portion 127, and advances inside the downstream portion 128 and the branched passage 130 independently. The shock wave 124 advancing in the downstream portion 128 passes through the supersonic nozzle 73 and then attenuates and disappears. On the other hand, the shock wave 124 advancing inside the branched passage 130 is reflected by the exhaust valve 25 (closed state) of the cylinder #B, reverses inside the branched passage 130, and returns to the collecting portion 127.

The branched passage 130 is designed such that the timing at which the shock wave 124 returns to the collecting portion 127 from the branched passage 130 and the timing at which the exhaust gas 129 with a high pressure discharged from the cylinder #A and advancing behind the shock wave inside the upstream portion 126 reaches the collecting portion 127 coincide with each other. Accordingly, as shown in FIG. 17C, the shock wave 114 which has propagated inside the exhaust passage 65 on the cylinder #A side from the branched passage 130 and the exhaust gas 129 with a high pressure inside this exhaust passage 65 collide with each other. In other words, the cross-section area and length of the branched passage 130 are dimensionally set such that the shock wave 124 and the exhaust gas 129 thus collide with each other.

Due to the collision between the shock wave 124 and the exhaust gas 129, the total pressure (P0) of the upstream of the inlet of the supersonic nozzle 73 becomes higher. Accordingly, it becomes easy to satisfy the condition that the ratio (P/P0) of the total pressure (P0) of the upstream of the inlet of the supersonic nozzle 73 and the downstream static pressure (P) of the throat portion 123 of the supersonic nozzle 73 becomes smaller than the critical pressure ratio of 0.528. By satisfying this condition, the exhaust gas 129 flows into the throat portion 123 at a speed exceeding the sonic speed.

Thus, the flow rate of the exhaust gas 129 flowing into the throat portion 123 reaches the sonic speed, and accordingly, the shock wave 124 is regenerated inside the supersonic nozzle 73. Accordingly, a negative pressure is generated inside the first exhaust pipe 56, and as a result, the temperature of the exhaust gas inside the first exhaust pipe 56 lowers.

When the cylinder #B is at the time of the exhaust stroke, conversely, the upstream portion 126 including the inside of the exhaust port 23 of the cylinder #A substantially functions as the branched passage 130. In other words, the shock wave 124 generated in the exhaust port 23 of the cylinder #B propagates in the upstream portion 126 (branched passage 130) on the cylinder #A side toward the cylinder #A, and is reflected by the exhaust valve 25 in a closed state. The reflected shock wave 124 propagates in the upstream portion 126 (branched passage 130) on the cylinder #A side toward the collecting portion 127, and in this collecting portion 127, collides with the exhaust gas 129 from the cylinder #B. Accordingly, the total pressure (P0) of the upstream of the inlet of the supersonic nozzle 73 rises, and the exhaust gas 129 flowing into the throat portion 123 easily reaches the sonic speed. Accordingly, a shock wave 124 can be caused in the supersonic nozzle 73, and along with this, a negative pressure can be generated inside the first exhaust pipe 56. Thus, the temperature of the exhaust gas generated from the cylinder #B can be lowered.

The first to fourth cylinder upstream portions 56a to 56d preferably have the same predetermined pipe length to be able to return a shock wave 124 generated in the exhaust port 23 of another cylinder whose ignition timing is different by 360 degrees to the first or second collecting portions 56e or 56f (the collecting portion 127 of the exhaust passage 65) at an optimum timing. For example, during the exhaust stroke of the first cylinder #1, a shock wave 124 generated in the first cylinder upstream portion 56a propagates from the first collecting portion 56e to the fourth cylinder upstream portion 56d, and is reflected by this fourth cylinder upstream portion 56d and returns to the first collecting portion 56e. The time necessary for this is equal to the time necessary for the shock wave 124 generated in the fourth cylinder upstream portion 56d to be reflected by the first cylinder upstream portion 56a and return to the first collecting portion 56e. This directly applies to the second cylinder upstream portion 56b and the third cylinder upstream portion 56c.

Thus, the time necessary for the shock wave 124 to return to the first or second collecting portion 56e or 56f is the same among all cylinders. Accordingly, in the supersonic nozzles 73 respectively provided at the first to fourth downstream portions 56g to 56j, the speed of the exhaust gases 129 can equally increase. As a result, the pressure in each portion inside the first exhaust pipe 56 can be substantially uniformly lowered.

FIG. 18 to FIG. 21 show the results of simulation of the effect of the exhaust device 55 of this preferred embodiment. As a result of verification through simulation, it was found that the exhaust gas pressure and the exhaust gas temperature significantly lowered inside the supersonic nozzle 73.

Figure 18:
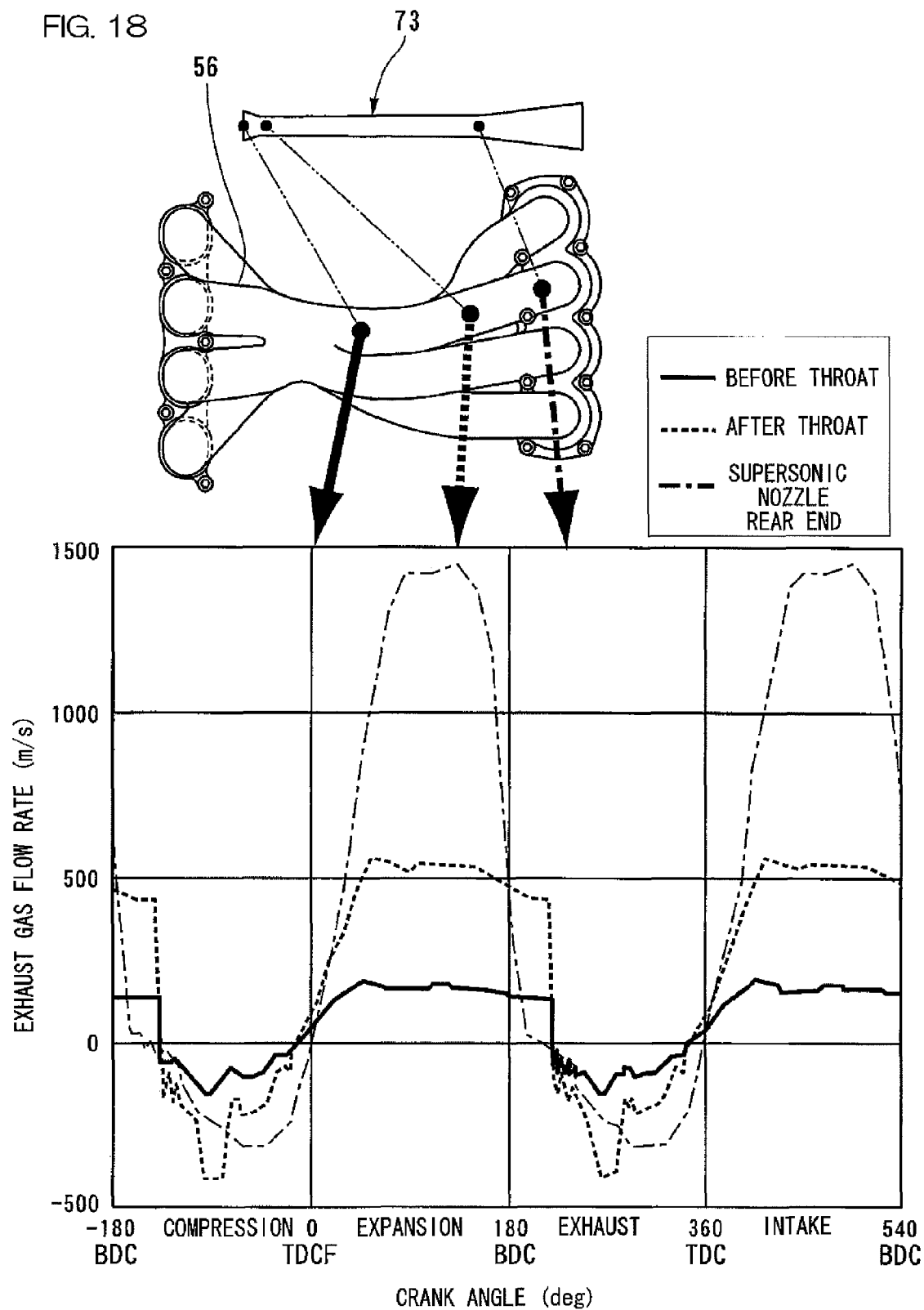
FIG. 18 is a graph illustrating changes in speed of exhaust gas inside the supersonic nozzle.

FIG. 18 is a graph showing the relationship between the crank angle and the flow rate of the exhaust gas in the first exhaust pipe 56. In this figure, the solid line shows changes in flow rate of the exhaust gas before the throat portion, and the dashed line shows changes in flow rate of the exhaust gas after the throat portion, and a chain line shows changes in flow rate of the exhaust gas at the rear end of the supersonic nozzle. As is understood from this figure, the shock wave is accelerated from about 559 m/s to about 1450 m/s, for example.

Figure 19:
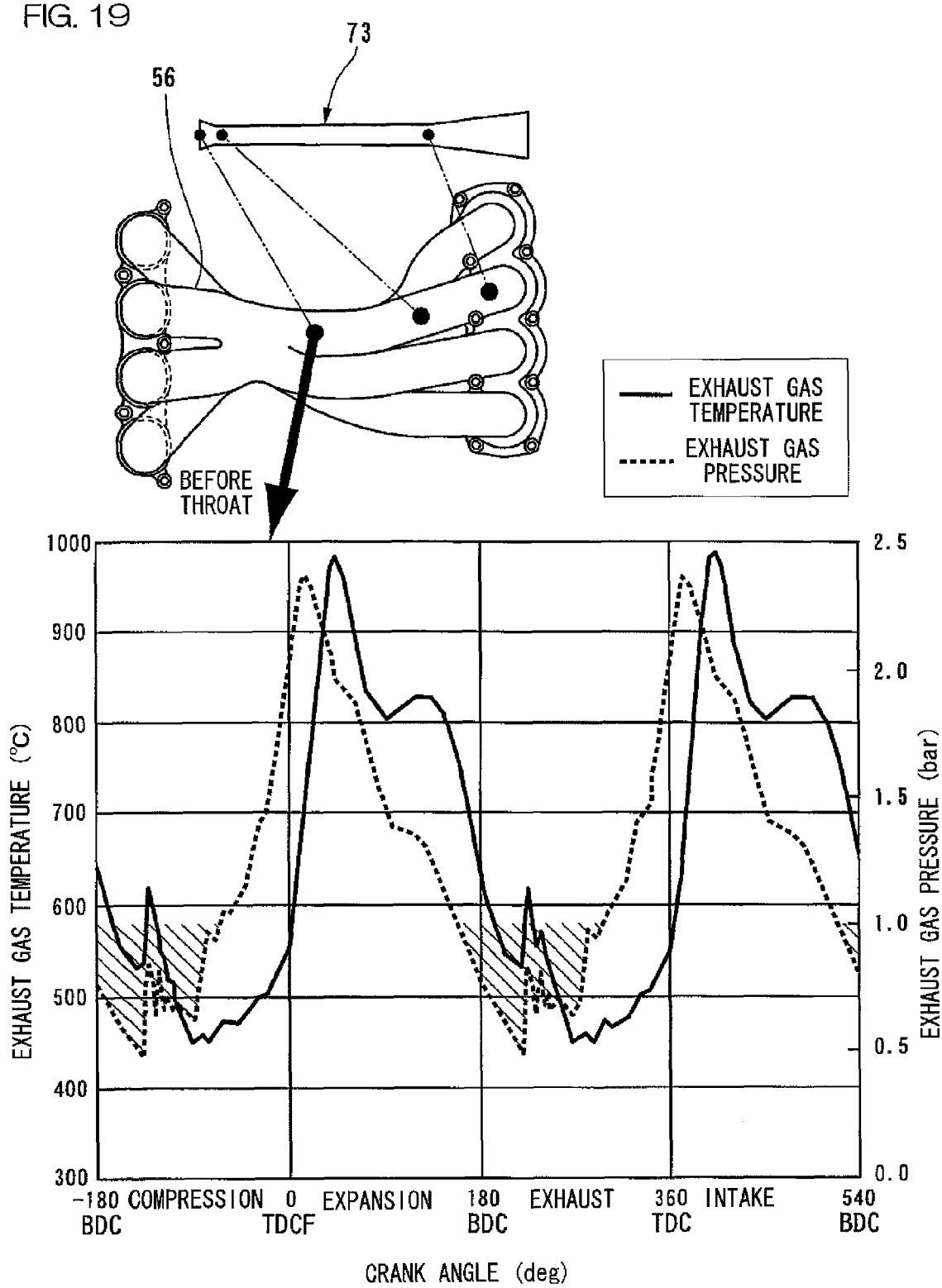
FIG. 19 is a graph illustrating changes in temperature and pressure of the exhaust gas before a throat.
Figure 20:
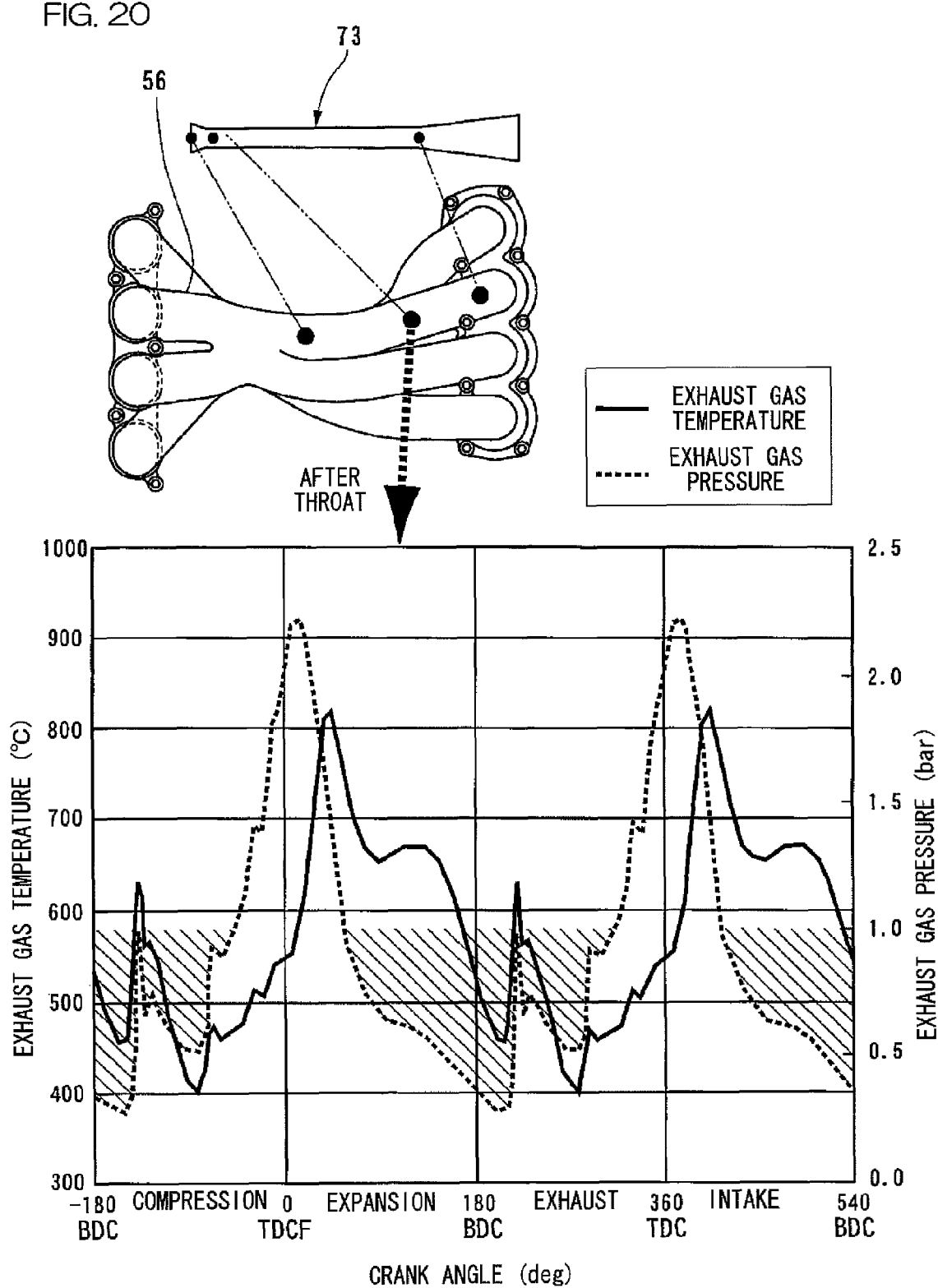
FIG. 20 is a graph illustrating changes in temperature and pressure of the exhaust gas after the throat.
Figure 21:
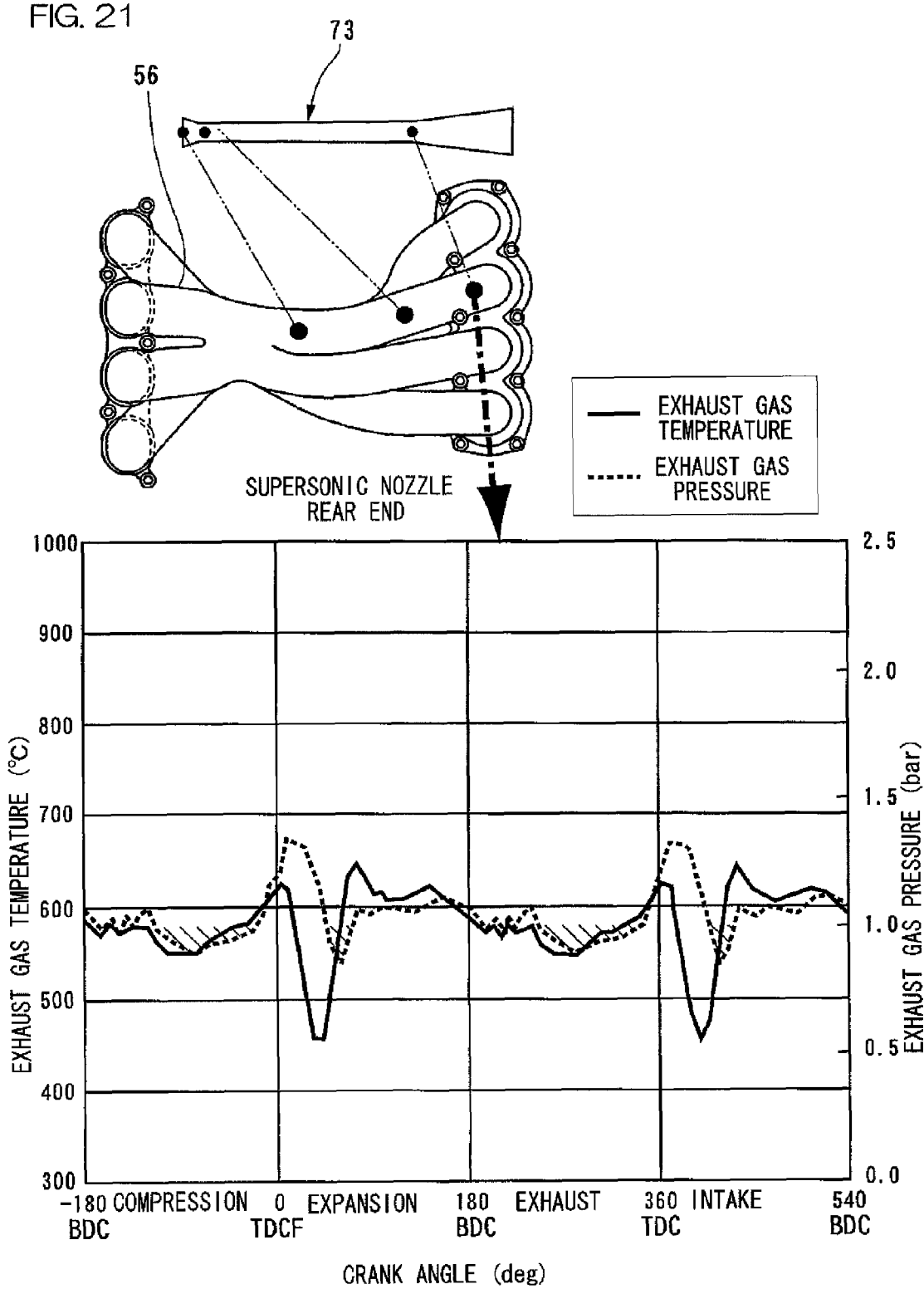
FIG. 21 is a graph showing changes in temperature and pressure of the exhaust gas at a rear end of the supersonic nozzle.

FIG. 19 to FIG. 21 are graphs showing the relationship among the crank angle and the exhaust gas temperature and the exhaust gas pressure inside the first exhaust pipe 56. FIG. 19 shows changes in exhaust gas temperature and exhaust gas pressure before the throat portion, FIG. 20 shows changes in exhaust gas temperature and exhaust gas pressure after the throat portion, and FIG. 21 shows changes in exhaust gas temperature and exhaust gas pressure at the rear end of the supersonic nozzle. In FIG. 19 to FIG. 21, the period during which the pressure of the exhaust gas is lower than the atmospheric pressure (when the inside of the first exhaust pipe 56 becomes a negative pressure) is shown by hatching. As is understood from FIG. 19 to FIG. 21, the temperature of the exhaust gas suddenly lowers inside the supersonic nozzle 73 during the exhaust stroke.

The pressure of the exhaust gas, for example, as shown in FIG. 20, becomes negative not only during the exhaust stroke but for a long period. The period during which the negative pressure is thus generated and the temperature of the exhaust gas is lowered is 560 degrees of the crank angle of 720 degrees of the 4-cycle stroke, and this corresponds to 72% of the whole stroke period.

Technical effects and advantages in the outboard motor 1 of this preferred embodiment will be illustrated hereinafter.

When the engine operates, the rotation of the crankshaft 11 is transmitted to the rotation shaft 101 of the air pump 64 via the belt transmission device 103. Accordingly, the air pump 64 suctions air from the intake duct 41, and feeds this air as secondary air into the first exhaust pipe 56.

The air inside the intake duct 41 is air inside the engine cover 8 suctioned from the air suction port 47 of the intake duct 41. Also, the air inside the engine cover 8 is the atmosphere which has flown into the engine cover 8 from the air inlet 48 of the engine cover 8.

Water that is splashed by the hull, the upper casing 5, and the lower casing 6, etc., during running of the hull may directly fly into the air inlet 48 of the engine cover 8. Also, such water splashes may be suctioned together with air by the negative pressure inside the engine cover 8. Further, rain may enter the air inlet 48. However, if water enters the inside of the engine cover 8, the water may be suctioned into the intake device and the air pump 64 through the intake duct 41.

In the present preferred embodiment, the air suction port 47 is positioned to be higher than the engine 4. Therefore, most of the water entering inside the engine cover 8 from the air inlet 48 flows down on the way to the air suction port 47. Therefore, even when water enters the inside of the engine cover 8 from the air inlet 48, it is difficult for water to be suctioned into the air suction port 47 of the intake duct 41. Even if water is suctioned into the inside of the engine cover 8, the amount of suctioned water is very small.

In the present preferred embodiment, as shown in FIG. 3, the air suction port 47 is formed at a position very distant in the front-rear direction of the outboard motor 1 from the air inlet 48. Further, the air suction port 47 is turned upward. Therefore, it is more difficult for water to be suctioned into the air suction port 47. Therefore, water hardly mixes with secondary air which is supplied to the upstream exhaust passage 65 by the air pump 64. Therefore, an exhaust device for an outboard motor engine in which water hardly mixes with the secondary air can be provided.

The outboard motor 1 can introduce a large amount of secondary air into the upstream exhaust passage 65 by the air pump 64. Therefore, the air-fuel ratio during engine operation (hereinafter, simply referred to as "combustion air-fuel ratio") can be set to be richer than a theoretical air-fuel ratio and the combustion temperature can be lowered while keeping high purifying efficiency of the first and second catalysts 61 and 62. In other words, exhaust gas and secondary air flow into the catalysts 61 and 62, such that even if oxygen in the exhaust gas runs short due to the combustion air-fuel ratio set to be richer, oxygen can be replenished by the secondary air. Therefore, even when the combustion air-fuel ratio is set to be richer than a theoretical air-fuel ratio, toxic components in the exhaust gas can be sufficiently purified by the catalysts 61 and 62. Therefore, while the state in which a clean exhaust gas is discharged is maintained, the combustion temperature can be lowered by setting the combustion air-fuel ratio to the richer side than the theoretical air-fuel ratio. As a result, a problem caused by an excessively high combustion temperature in the engine 4, that is, abnormal combustion such as self-ignition and knocking can be reliably prevented.

By setting the combustion air-fuel ratio to the richer side than the theoretical air-fuel ratio, the members inside the combustion chamber can be cooled by the vaporization heat of the fuel. Therefore, the inner surface of the combustion chamber is cooled by the fuel, such that problems caused by excessive temperature rise inside the combustion chamber, that is, melting of the piston and deterioration of the valve seat, can be prevented.

In addition, the temperature of the secondary air is substantially the temperature of the atmosphere, and is much lower than the temperature of the exhaust gas. Therefore, the temperature of the exhaust gas can be lowered by the large amount of secondary air at the relatively low temperature introduced into the upstream exhaust passage 65. Accordingly, at the catalysts 61 and 62, an occurrence of the so-called sintering phenomenon can be reliably prevented. This sintering phenomenon is a phenomenon in which the catalyst is held at a high temperature not less than about 850° C. for a long period and noble metals in the catalyst thermally adhere to each other and reduce the surface area of the noble metals.

Also, the air pump 64 suctions air inside the intake duct 41. The intake duct 41 is formed into a U shape (see FIG. 6) extending from the upper end to the lower end of the engine 4 in a side view. Therefore, intake air which has flown into the intake duct 41 from the air suction port 47 flows down inside the upstream side vertical portion 45 and collides with the bottom or a wall around the bottom of the upstream side horizontal portion 44. Then, this intake air turns around in the upstream side horizontal portion 44 and flows up inside the downstream side vertical portion 43. Therefore, even when water is suctioned into the intake duct 41, the water can be prevented from entering so as not to cause any problem.

In other words, even when the outboard motor 1 is used at sea and seawater is suctioned into the intake duct 41 together with intake air, seawater adheres to the bottom or the wall around the bottom of the upstream side horizontal portion 44, and accordingly, the amount of seawater contained in the intake air is greatly reduced. By thus reducing the amount of seawater contained in the intake air, although this intake air is introduced into the exhaust passage 65 as secondary air by the air pump 64, the catalysts 61 and 62 can be protected from corrosion caused by the salt content in seawater.

Further, in the present preferred embodiment, in the secondary air introducing passage connecting the air pump 64 and the upstream exhaust passage 65, first and second reed valves 96 and 97 are provided. Therefore, even if a so-called afterburn occurs inside the upstream exhaust passage 65 and flames spread to the secondary air introducing passage, the flames can be prevented from flowing backward toward the air pump 64 by the first and second reed valves 96 and 97.

An afterburn is a phenomenon in which fuel explodes inside an exhaust passage. The afterburn easily occurs when, for example, the throttle valve 46 is suddenly fully closed during operation of the engine 4 with the throttle valve 46 fully opened. According to this operation, a fuel adhering to the intake ports 22 flows into the cylinders 21, and air-fuel mixture temporarily reaches a high concentration. Further, due to this operation, the negative pressure inside the cylinders 21 becomes excessively high. Therefore, at the time of valve overlap (a period in which the intake valve 24 and the exhaust valve 25 are both opened), a large amount of exhaust gas flows into the cylinders 21, and an internal EGR (Exhaust Gas Recirculation) occurs.

Thus, when a state with a richer air-fuel ratio and a state in which a combustion start timing is delayed in the cylinders due to internal EGR overlap, the engine 4 temporarily misfires, and the fuel inside the cylinders 21 flows out into the upstream exhaust passage 65. Thereafter, when the engine 4 shifts from the misfire state to a combustion state, the fuel inside the upstream exhaust passage 65 is ignited and an afterburn occurs.

When flames of this explosion spread to the air pump 64 through the secondary air introducing passage, a coating for maintaining airtightness, such as a fluorine resin layer inside the air pump 64, is burned out. Therefore, the efficiency of the air pump 64 is deteriorated. According to the present preferred embodiment, the flames do not reach the air pump 64, such that the air pump 64 can be protected from the flames.

The air pump 64 is attached to a side portion of the engine 4 such that the rotation shaft 101 extends along the up-down direction. An upper end portion of the rotation shaft 101 is connected to the crankshaft 11 via the transmission device 103 positioned above the engine 4. Therefore, the transmission device 103 can be arranged close to and along the upper surface of the engine 4. Further, the air pump 64 can be arranged in a dead space between a side portion of the engine 4 and the engine cover 8. As a result, although it is equipped with the engine-driven air pump 64, an outboard motor 1 which is compact can be provided.

Also, the air pump 64 is arranged above the first exhaust pipe 56 extending in the front-rear direction of the outboard motor 1 from the exhaust gas outlets 29 of the engine 4. Further, the position of this air pump 64 overlaps the first exhaust pipe 56 in a plan view. Therefore, the air pump 64 and the secondary air introducing passage (the first to third pipes 94, 97, and 98 and the first and second reed valves 96 and 97) can be arranged in a dead space formed above the first exhaust pipe 56. Therefore, without increasing the size of the engine cover 8, an exhaust device 55 arranged to supply secondary air into the upstream exhaust passage 65 by the air pump 64 can be installed in the outboard motor 1.

An upper portion of the first exhaust pipe 56 has a U shape opened upward as shown in FIG. 2. The air pump 64 is accommodated in a recess 102 having a U shape. Therefore, although the air pump 64 and the first exhaust pipe 56 are arranged alongside in the up-down direction, the position of the upper end of the air pump 64 and the position of the upper end of the first exhaust pipe 56 can be substantially matched with each other. Accordingly, the air pump 64 and the first exhaust pipe 56 arranged on a side portion of the engine 4 can be made compact in the up-down direction as a whole. Therefore, an exhaust device 55 for an outboard motor engine in which the engine cover 8 can be formed to be smaller can be provided.

In the exhaust device 55, supersonic nozzles 73 are provided in the first exhaust pipe 56. The flow rate of the exhaust gas is accelerated by the supersonic nozzles 73 to reach a sonic speed. Accordingly, as described above, a negative pressure is generated inside the first exhaust pipe 56. Therefore, a resistance when secondary air is fed into the first exhaust pipe 56 by the air pump 64 is greatly reduced. Further, the amount of secondary air to be supplied to the first exhaust pipe 56 can be increased.

Second Preferred Embodiment

Figure 22:
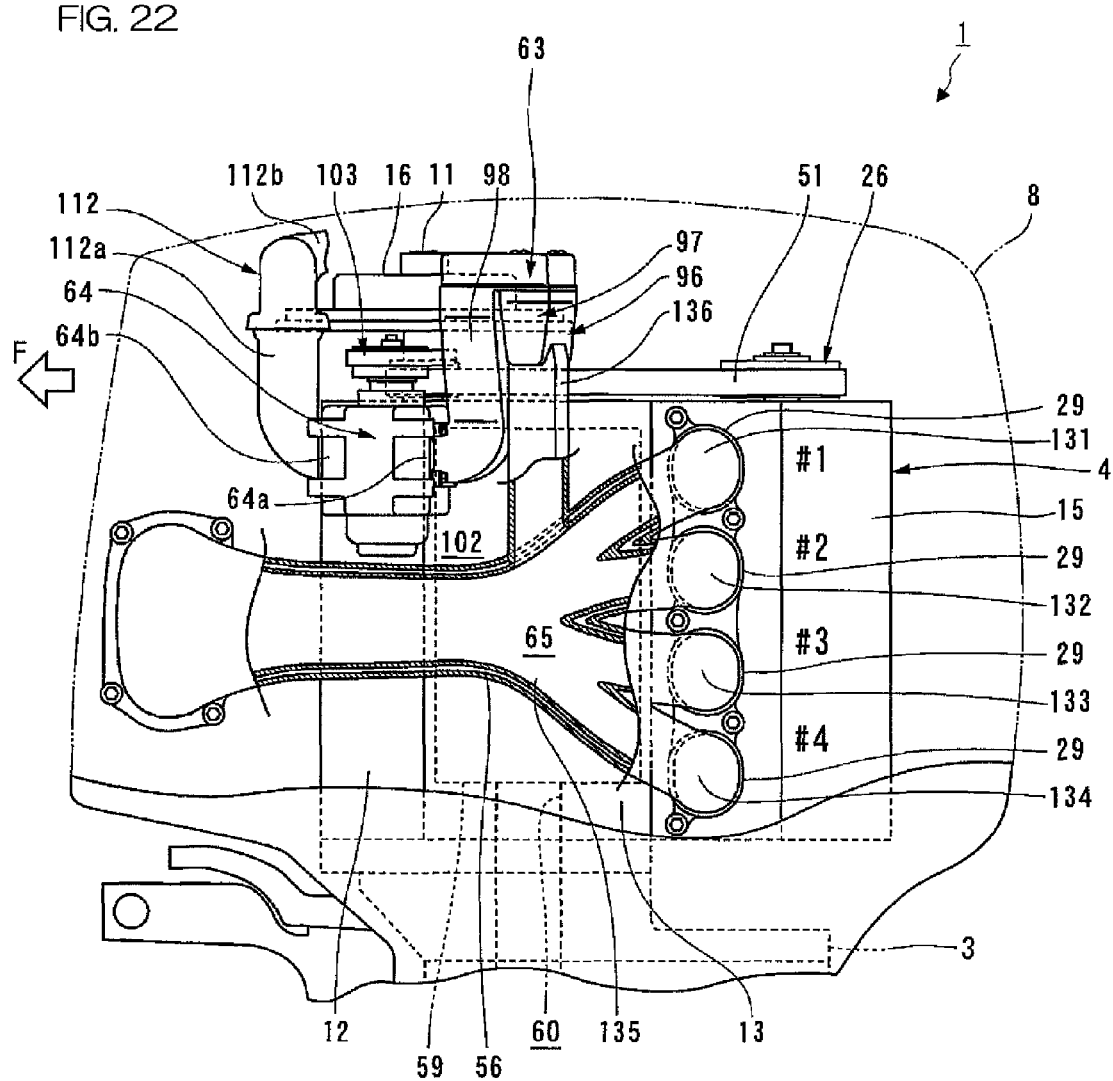
FIG. 22 is a side view of an outboard motor of a second preferred embodiment of the present invention, illustrating a configuration of an exhaust pipe having a structure which collects exhaust gases from the cylinders together.
Figure 23:
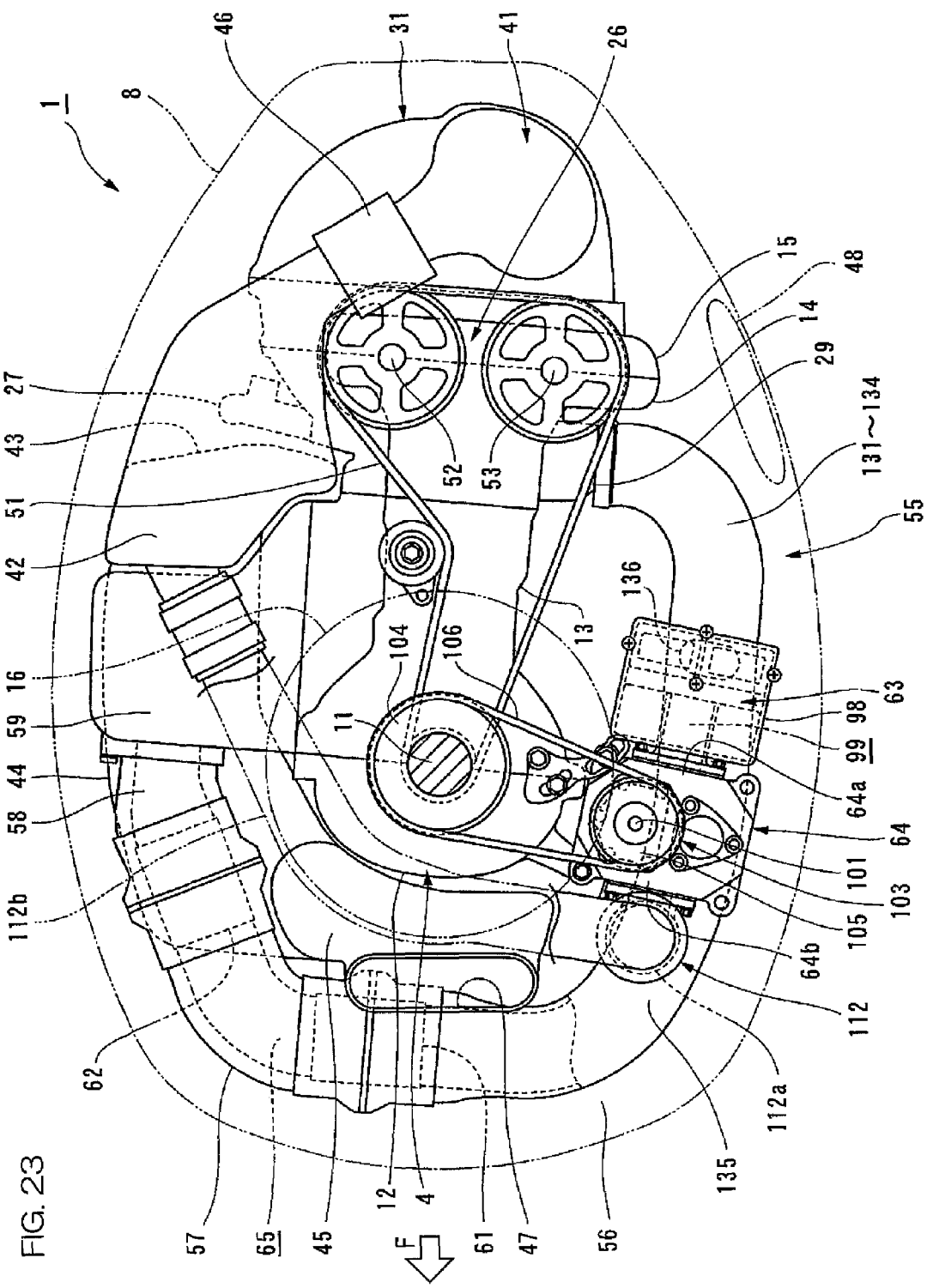
FIG. 23 is a plan view of the outboard motor of the second preferred embodiment of the present invention.

A second preferred embodiment of the present invention will be described with reference to FIG. 22 and FIG. 23. FIG. 22 is a side view of an outboard motor 1 of the second preferred embodiment of the present invention, and FIG. 23 is a plan view of the outboard motor 1 of the second preferred embodiment of the present invention. In FIG. 22 and FIG. 23, members identical to or equivalent to those described in FIG. 1 to FIG. 21 will be designated with the same reference numerals, and detailed description thereof will be omitted.

The first exhaust pipe 56 of the exhaust device 55 shown in FIG. 22 and FIG. 23 is arranged so as to collect exhaust gases of all cylinders at one point. In other words, the first exhaust pipe 56 includes upstream portions 131 to 134 of the respective cylinders to be connected to the exhaust gas outlets 29 of the respective cylinders, and a downstream portion 135 which collects the upstream portions 131 to 134 together.

The upstream portions 131 to 134 extend toward the central portion in the up-down direction of the cylinder body 13 from the exhaust gas outlets 29 of the corresponding cylinders in a side view as shown in FIG. 22. The upstream portion 131 is positioned highest among the four upstream portions 131 to 134. To a connection portion between the upstream portion 131 and the downstream portion 135, a downstream side end portion of the secondary air introducing pipe 63 is connected. A portion between the first exhaust pipe 56 and the first and second reed valves 96 and 97 in the secondary air introducing pipe 63 is defined by one pipe 136. This pipe 136 is formed preferably by casting integrally with the first exhaust pipe 56, for example.

A sectional shape of the downstream portion 135 of the first exhaust pipe 56 is long vertically. In detail, the width of the downstream portion 135 in the up-down direction is longer than the width of the downstream portion 135 in the left-right direction of the outboard motor 1 (width in the front-rear direction on the front end portion of the downstream portion 135). Thus, by making the sectional shape of the downstream portion 135 long vertically, the passage cross-section area of the downstream portion 135 can be increased while a space between the engine 4 and the engine cover 8 is effectively utilized.

As shown in FIG. 23, the downstream portion 135 of the first exhaust pipe 56 is formed so as to assume one pipe. Accordingly, the second exhaust pipe 57 and the third exhaust pipe 58 of the present preferred embodiment are defined each by one pipe. Therefore, in the exhaust device 55, a first catalyst 61 and a second catalyst 62 are provided, respectively. The second and third exhaust pipes 57 and 58 and the first and second catalysts 61 and 62 have sectional shapes long vertically like the first exhaust pipe 56.

In the exhaust device 55 shown in FIG. 22 and FIG. 23, a large amount of secondary air can also be supplied into the upstream exhaust passage 65 by the air pump 64.

In addition, the first and second preferred embodiments show an example in which an exclusive air pump 64 is used for supplying secondary air into the upstream exhaust passage 65. However, secondary air may be supplied into the upstream exhaust passage 65 by a mechanism other than the air pump 64. In other words, when a supercharger which forcibly supplies air into the intake passage of the engine 4 is provided, although the supercharger is not shown, air discharged from the supercharger may be led as secondary air into the upstream exhaust passage 65. Accordingly, the same effects as in the above-described preferred embodiments can be obtained.

As described above, the outboard motors 1 of the first and second preferred embodiment include exhaust devices 55 of the first and second preferred embodiments, respectively. Each exhaust device 55 is formed such that water hardly mixes with secondary air to be supplied into the exhaust passage of the engine 4 by the air pump 64. Therefore, a problem caused by mixture of water is difficult to occur in the first and second catalysts 61 and 62. Therefore, these outboard motors 1 can sufficiently purify exhaust gas by the first and second catalysts 61 and 62. As a result, these outboard motors 1 can exhaust clean exhaust gas for a long period of time.

A detailed description was provided of the preferred embodiments of the present invention. However, the preferred embodiments are only specific examples to describe the technical content of the present invention, and the present invention is not to be construed as limited to these specific examples. The spirit and scope of the present invention is restricted only by the appended claims.

The present application corresponds to Japanese Patent Application No. 2008-219373 filed in the Japan Patent Office on Aug. 28, 2008, and the entire disclosure of the application is incorporated in its entirety herein by reference.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. An exhaust device for an outboard motor engine comprising:
    an exhaust passage connected to the outboard motor engine arranged to support a crankshaft extending along an up-down direction;
    a catalyst arranged in the exhaust passage;
    an air inlet arranged at a position higher than the engine inside an engine cover covering the engine;
    an air pump which is supported by the engine and is arranged to supply air taken through the air inlet to an upstream side of the catalyst in the exhaust passage; and
    a transmission device arranged on the engine; wherein
    the air pump is attached to a side portion of the engine and includes a rotation shaft extending along the up-down direction; and
    an upper end portion of the rotation shaft is coupled to the crankshaft of the engine via the transmission device.

2. The exhaust device according to claim 1, wherein the air inlet is arranged to be higher than a highest cylinder of the engine.

3. The exhaust device according to claim 1, further comprising:
    an air introducing passage connecting the air pump and the exhaust passage; and
    a check valve which is provided in the air introducing passage and is arranged to block backward flow of exhaust gas toward the air pump.

4. An exhaust device for an outboard motor engine comprising:
    an exhaust passage connected to the outboard motor engine arranged to support a crankshaft extending along an up-down direction;
    a catalyst arranged in the exhaust passage;
    an air inlet arranged at a position higher than the engine inside an engine cover covering the engine; and
    an air pump which is supported by the engine and is arranged to supply air taken through the air inlet to an upstream side of the catalyst in the exhaust passage; wherein
    the engine includes an exhaust gas outlet opened on a side portion of the engine;
    the exhaust passage includes an upstream exhaust passage defined by an exhaust pipe extending along a front-rear direction of the outboard motor from the exhaust gas outlet and a main exhaust passage connected to a downstream end of the upstream side exhaust passage and positioned below the engine;
    the catalyst is arranged in the upstream exhaust passage; and
    the air pump is arranged above the exhaust pipe at a position overlapping the exhaust pipe in a plan view.

5. The exhaust device according to claim 4, further comprising an air introducing passage arranged to connect the air pump and the exhaust passage; wherein
    the engine includes a plurality of cylinders;
    the exhaust pipe includes upstream portions each provided for a respective one of the plurality of cylinders, and having inlet ends connected to the plurality of cylinders, and a collecting portion arranged to connect outlet ends of the upstream portions;
    the catalyst is arranged on the downstream side of the collecting portion;
    the air introducing passage is connected to the collecting portion; and
    the air pump is arranged above the exhaust pipe.

6. An exhaust device for an outboard motor engine comprising:
- an exhaust passage connected to the outboard motor engine arranged to support a crankshaft extending along an up-down direction;
- a catalyst arranged in the exhaust passage;
- an air inlet arranged at a position higher than the engine inside an engine cover covering the engine;
- an air pump which is supported by the engine and is arranged to supply air taken through the air inlet to an upstream side of the catalyst in the exhaust passage, and
- a substantially U-shaped passage having a substantially U shaped configuration in a side view, wherein the air pump is connected to the air inlet via the substantially U-shaped passage.

7. The exhaust device according to claim 6, further comprising an intake passage connected to a cylinder of the engine, wherein the intake passage is connected to the air inlet via the substantially U-shaped passage.

8. An outboard motor comprising:
- an engine arranged to support a crankshaft extending along an up-down direction;
- an engine cover arranged to cover the engine;
- an exhaust passage connected to the engine;
- a catalyst arranged in the exhaust passage;
- an air inlet arranged at a position higher than the engine inside the engine cover;
- an air pump which is supported by the engine and is arranged to supply air taken from the air inlet to an upstream side of the catalyst in the exhaust passage; and
- a transmission device arranged on the engine; wherein
- the air pump is attached to a side portion of the engine and includes a rotation shaft extending along the up-down direction; and
- an upper end portion of the rotation shaft is coupled to the crankshaft of the engine via the transmission device.

9. The outboard motor according to claim 8, wherein the air inlet is arranged to be higher than a highest cylinder of the engine.

10. The outboard motor according to claim 8, further comprising:
- an air introducing passage connecting the air pump and the exhaust passage; and
- a check valve which is provided in the air introducing passage and is arranged to block backward flow of exhaust gas toward the air pump.

11. An outboard motor comprising:
- an engine arranged to support a crankshaft extending along an up-down direction;
- an engine cover arranged to cover the engine;
- an exhaust passage connected to the engine;
- a catalyst arranged in the exhaust passage;
- an air inlet arranged at a position higher than the engine inside the engine cover; and
- an air pump which is supported by the engine and is arranged to supply air taken from the air inlet to an upstream side of the catalyst in the exhaust passage; wherein
- the engine includes an exhaust gas outlet opened on a side portion of the engine;
- the exhaust passage includes an upstream exhaust passage defined by an exhaust pipe extending along a front-rear direction of the outboard motor from the exhaust gas outlet and a main exhaust passage connected to a downstream end of the upstream exhaust passage and positioned below the engine;
- the catalyst is arranged in the upstream exhaust passage; and
- the air pump is arranged above the exhaust pipe, at a position overlapping the exhaust pipe in a plan view.

12. The outboard motor according to claim 11, further comprising an air introducing passage arranged to connect the air pump and the exhaust passage; wherein
- the engine includes a plurality of cylinders;
- the exhaust pipe includes upstream portions each provided for a respective one of the plurality of cylinders, and having inlet ends connected to the plurality of cylinders, and a collecting portion arranged to connect outlet ends of the upstream portions;
- the catalyst is provided on a downstream side of the collecting portion; and
- the air introducing passage is connected to the collecting portion.

13. An outboard motor comprising:
- an engine arranged to support a crankshaft extending along an up-down direction;
- an engine cover arranged to cover the engine;
- an exhaust passage connected to the engine;
- a catalyst arranged in the exhaust passage;
- an air inlet arranged at a position higher than the engine inside the engine cover;
- an air pump which is supported by the engine and is arranged to supply air taken from the air inlet to an upstream side of the catalyst in the exhaust passage; and
- a substantially U-shaped passage having a substantially U shaped configuration in a side view, wherein the air pump is connected to the air inlet via the substantially U-shaped passage.

14. The outboard motor according to claim 13, further comprising an intake passage connected to the cylinder of the engine, wherein the intake passage is connected to the air inlet via the substantially U-shaped passage.

* * * * *